(12) United States Patent
Wooters

(10) Patent No.: US 11,455,475 B2
(45) Date of Patent: *Sep. 27, 2022

(54) HUMAN-TO-HUMAN CONVERSATION ANALYSIS

(71) Applicant: Verint Americas Inc., Alpharetta, GA (US)

(72) Inventor: Charles C. Wooters, Annapolis, MD (US)

(73) Assignee: Verint Americas Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/723,128

(22) Filed: Dec. 20, 2019

(65) Prior Publication Data

US 2020/0125805 A1 Apr. 23, 2020

Related U.S. Application Data

(60) Continuation of application No. 16/504,773, filed on Jul. 8, 2019, now Pat. No. 10,515,156, which is a (Continued)

(51) Int. Cl.
*G06F 40/40* (2020.01)
*G06F 40/35* (2020.01)

(52) U.S. Cl.
CPC .............. *G06F 40/40* (2020.01); *G06F 40/35* (2020.01)

(58) Field of Classification Search
CPC ........ G06F 17/28; G06F 17/279; G06F 40/40; G06F 40/35

(Continued)

(56) References Cited

U.S. PATENT DOCUMENTS 5,730,603 A * 3/1998 Harless ................... G09B 7/04
434/308
5,761,687 A 6/1998 Hon et al.
(Continued)

OTHER PUBLICATIONS

Ballantyne, D., "Dialogue and its role in the development of relationship specific knowledge," Journal of Business & Industrial Marketing, vol. 19, No. 2, 2004, pp. 114-123.

(Continued)

*Primary Examiner* — Edwin S Leland, III
(74) *Attorney, Agent, or Firm* — Meunier, Carlin & Curfman LLC

(57) ABSTRACT

Customer support, and other types of activities in which there is a dialogue between two humans can generate large volumes of conversation records. Automated analysis of these records can provide information about high-level features of, for example, the workings of a customer service department. Analysis of these conversations between a customer and a customer-support agent may also allow identification of customer support activities that can be provided by virtual agents instead of actual human agents. The analysis may evaluate conversations in terms of complexity, duration, and sentiment of the participants. Additionally, the conversations may also be analyzed to identify the existence of selected concepts or keywords. Workflow characteristics, the extent to which the conversation represents a multi-step process intended to accomplish a task, may also be determined for the conversations. Characteristics of individual conversations may be combined to obtain generalized or representative features for a set of a conversation records.

30 Claims, 10 Drawing Sheets

Related U.S. Application Data division of application No. 13/778,824, filed on Feb. 27, 2013, now Pat. No. 10,346,542.

(60) Provisional application No. 61/696,040, filed on Aug. 31, 2012.

(58) Field of Classification Search
USPC .......................................................... 704/9
See application file for complete search history.

(56) References Cited

U.S. PATENT DOCUMENTS

| | | | |
|---|---|---|---|
| 5,918,222 A | 6/1999 | Fukui et al. | |
| 5,999,904 A * | 12/1999 | Brown | G10L 15/22 |
| | | | 704/E15.04 |
| 6,097,442 A * | 8/2000 | Rumreich | H04N 7/0885 |
| | | | 348/E5.112 |
| 6,305,942 B1 * | 10/2001 | Block | G09B 5/065 |
| | | | 434/167 |
| 6,556,970 B1 * | 4/2003 | Sasaki | G10L 15/19 |
| | | | 706/50 |
| 6,847,931 B2 * | 1/2005 | Addison | G10L 13/10 |
| | | | 704/266 |
| 6,925,455 B2 | 8/2005 | Gong et al. | |
| 7,149,687 B1 | 12/2006 | Gorin et al. | |
| 7,155,391 B2 * | 12/2006 | Taylor | G10L 15/065 |
| | | | 704/235 |
| 7,487,094 B1 | 2/2009 | Konig et al. | |
| 7,590,224 B1 * | 9/2009 | Gorin | G06F 40/216 |
| | | | 379/88.04 |
| 8,086,462 B1 * | 12/2011 | Alonso | G06Q 30/02 |
| | | | 379/88.01 |
| 8,086,549 B2 | 12/2011 | Qi et al. | |
| 8,311,863 B1 * | 11/2012 | Kemp | G06Q 10/0639 |
| | | | 705/7.29 |
| 8,340,971 B1 * | 12/2012 | Abella | H04M 3/493 |
| | | | 704/270.1 |
| 8,543,398 B1 | 9/2013 | Strope et al. | |
| 8,554,559 B1 | 10/2013 | Aleksic et al. | |
| 8,571,859 B1 | 10/2013 | Aleksic et al. | |
| 8,600,747 B2 * | 12/2013 | Abella | H04M 3/4936 |
| | | | 379/88.04 |
| 8,605,885 B1 * | 12/2013 | Wooters | H04M 3/51 |
| | | | 704/255 |
| 8,677,377 B2 | 3/2014 | Cheyer et al. | |
| 8,805,684 B1 | 8/2014 | Aleksic et al. | |
| 8,843,372 B1 * | 9/2014 | Isenberg | G06F 40/35 |
| | | | 704/250 |
| 8,880,398 B1 | 11/2014 | Aleksic et al. | |
| 9,123,333 B2 | 9/2015 | Amarilli et al. | |
| 9,202,461 B2 | 12/2015 | Biadsy et al. | |
| 9,460,722 B2 | 10/2016 | Sidi et al. | |
| 9,503,579 B2 | 11/2016 | Watson et al. | |
| 9,508,346 B2 | 11/2016 | Achituv | |
| 9,563,622 B1 | 2/2017 | Anderson | |
| 9,715,875 B2 | 7/2017 | Piernot et al. | |
| 10,170,116 B1 | 1/2019 | Kelly et al. | |
| 10,909,124 B2 | 2/2021 | Lim et al. | |
| 2002/0062342 A1 * | 5/2002 | Sidles | G06F 40/174 |
| | | | 715/224 |
| 2002/0152262 A1 * | 10/2002 | Arkin | H04L 67/104 |
| | | | 709/225 |
| 2003/0046123 A1 * | 3/2003 | Chen | G06Q 10/06375 |
| | | | 705/7.29 |
| 2003/0055640 A1 | 3/2003 | Burshtein et al. | |
| 2003/0115056 A1 * | 6/2003 | Gusler | G10L 15/26 |
| | | | 704/235 |
| 2003/0167195 A1 * | 9/2003 | Fernandes | G06Q 30/0204 |
| | | | 705/7.14 |
| 2003/0191627 A1 * | 10/2003 | Au | G06F 40/30 |
| | | | 704/9 |
| 2004/0249650 A1 * | 12/2004 | Freedman | G06Q 30/02 |
| | | | 705/7.29 |
| 2004/0264677 A1 * | 12/2004 | Horvitz | G10L 15/26 |
| | | | 704/E15.045 |
| 2005/0060574 A1 * | 3/2005 | Klotz | H04L 43/0823 |
| | | | 726/4 |
| 2005/0080628 A1 * | 4/2005 | Kuperstein | G10L 15/22 |
| | | | 704/E15.04 |
| 2005/0097507 A1 * | 5/2005 | White | G06Q 30/02 |
| | | | 717/102 |
| 2005/0117729 A1 * | 6/2005 | Reding | H04M 3/56 |
| | | | 379/196 |
| 2006/0080130 A1 * | 4/2006 | Choksi | G06Q 30/016 |
| | | | 709/206 |
| 2007/0005369 A1 * | 1/2007 | Potter | G10L 15/063 |
| | | | 704/E15.04 |
| 2007/0011012 A1 * | 1/2007 | Yurick | G10L 15/26 |
| | | | 704/277 |
| 2007/0071212 A1 * | 3/2007 | Quittek | H04L 29/06027 |
| | | | 379/210.02 |
| 2007/0100790 A1 * | 5/2007 | Cheyer | G06N 5/022 |
| 2008/0012701 A1 * | 1/2008 | Kass | A61B 5/165 |
| | | | 340/539.11 |
| 2008/0062890 A1 * | 3/2008 | Temple | G06F 9/505 |
| | | | 370/254 |
| 2008/0086690 A1 * | 4/2008 | Verma | H04L 12/66 |
| | | | 715/736 |
| 2008/0091423 A1 * | 4/2008 | Roy | G10L 15/26 |
| | | | 704/235 |
| 2008/0221882 A1 * | 9/2008 | Bundock | G10L 15/26 |
| | | | 704/235 |
| 2008/0240374 A1 * | 10/2008 | Conway | H04M 3/5175 |
| | | | 379/67.1 |
| 2008/0252780 A1 * | 10/2008 | Polumbus | H04N 17/04 |
| | | | 348/E7.001 |
| 2009/0012970 A1 * | 1/2009 | Ziv | G06F 16/35 |
| 2009/0103709 A1 * | 4/2009 | Conway | H04M 3/42221 |
| | | | 379/265.09 |
| 2009/0193011 A1 | 7/2009 | Blair-Goldensohn et al. | |
| 2009/0193328 A1 | 7/2009 | Reis et al. | |
| 2009/0222395 A1 | 9/2009 | Light et al. | |
| 2009/0224867 A1 * | 9/2009 | O'Shaughnessy | H04M 1/72457 |
| | | | 340/5.1 |
| 2009/0240652 A1 * | 9/2009 | Su | G06F 16/93 |
| 2009/0290689 A1 * | 11/2009 | Watanabe | H04M 3/5175 |
| | | | 704/235 |
| 2010/0104087 A1 * | 4/2010 | Byrd | H04M 3/5133 |
| | | | 379/265.09 |
| 2010/0131274 A1 * | 5/2010 | Stent | G10L 15/063 |
| | | | 704/257 |
| 2010/0332287 A1 * | 12/2010 | Gates | G06Q 30/02 |
| | | | 379/265.09 |
| 2011/0069822 A1 * | 3/2011 | Jan | G06F 40/30 |
| | | | 379/88.04 |
| 2011/0206198 A1 * | 8/2011 | Freedman | H04M 3/51 |
| | | | 379/265.03 |
| 2011/0267419 A1 * | 11/2011 | Quinn | H04N 7/15 |
| | | | 348/E7.083 |
| 2012/0254917 A1 * | 10/2012 | Burkitt | H04N 21/472 |
| | | | 725/40 |
| 2012/0310629 A1 * | 12/2012 | Stewart | G10L 15/22 |
| | | | 704/270.1 |
| 2013/0018824 A1 | 1/2013 | Ghani et al. | |
| 2013/0103399 A1 * | 4/2013 | Gammon | G10L 21/10 |
| | | | 704/235 |
| 2013/0173254 A1 | 7/2013 | Alemi | |
| 2013/0282682 A1 | 10/2013 | Batraski et al. | |
| 2013/0297216 A1 * | 11/2013 | Hirst | G16H 50/20 |
| | | | 702/19 |
| 2013/0300939 A1 * | 11/2013 | Chou | G06V 20/49 |
| | | | 348/700 |
| 2014/0067375 A1 * | 3/2014 | Wooters | G06F 40/35 |
| | | | 704/9 |
| 2014/0074454 A1 | 3/2014 | Brown et al. | |
| 2014/0142940 A1 | 5/2014 | Ziv et al. | |
| 2014/0142944 A1 | 5/2014 | Ziv et al. | |
| 2014/0222419 A1 | 8/2014 | Romano et al. | |

(56) References Cited

U.S. PATENT DOCUMENTS

| | | | |
|---|---|---|---|
| 2014/0222476 | A1 | 8/2014 | Romano |
| 2014/0297268 | A1* | 10/2014 | Govrin ..................... G06N 5/04 704/9 |
| 2015/0025887 | A1 | 1/2015 | Sidi et al. |
| 2015/0066502 | A1 | 3/2015 | Achituv et al. |
| 2015/0066503 | A1 | 3/2015 | Achituv et al. |
| 2015/0112981 | A1 | 4/2015 | Conti et al. |
| 2015/0286627 | A1 | 10/2015 | Chang et al. |
| 2015/0348549 | A1 | 12/2015 | Giuli et al. |
| 2016/0217792 | A1 | 7/2016 | Gorodetski et al. |
| 2016/0217793 | A1 | 7/2016 | Gorodetski et al. |
| 2016/0350426 | A1 | 12/2016 | Wu et al. |
| 2017/0053653 | A1 | 2/2017 | Sidi et al. |
| 2017/0060996 | A1 | 3/2017 | Das |
| 2017/0068670 | A1 | 3/2017 | Orr et al. |
| 2017/0220677 | A1 | 8/2017 | Kazi et al. |
| 2018/0060326 | A1 | 3/2018 | Kuo et al. |
| 2018/0101533 | A1 | 4/2018 | Robichaud |
| 2018/0114337 | A1 | 4/2018 | Li et al. |
| 2018/0330721 | A1 | 11/2018 | Thomson et al. |
| 2019/0103102 | A1 | 4/2019 | Tseretopoulos et al. |
| 2019/0354594 | A1 | 11/2019 | Foster et al. |

OTHER PUBLICATIONS

Beaver, I., et al., "An Annotated Corpus of Relational Strategies in Customer Service," arXiv.org, Cornell University Library, XP080953431, 2017, 19 pages.

Bhaskar, J., et al., "Hybrid Approach for Emotion Classification of Audio Conversation Based on Text and Speech Mining," International Conference on Information and Communication Technologies (ICICT 2014), Procedia Computer Science, vol. 46, 2015, pp. 635-643.

Bickmore, T., et al., "Relational Agents: A Model and Implementation of Building User Trust," Proceedings of the SIGCHI Conference on Human Factors in Computing Systems (CHI '01), ACM, 2001, pp. 396-403.

Burge, J., Emojipedia, retrieved on Nov. 12, 2019 from https://blog.emojipedia.org/author/jeremyburge.com, 2013, 2 pages.

Casale, S., et al., "Speech Emotion Classification using Machine Learning Algorithms," The International Conference on Semantic Computing, IEEE Computer Society, 2008, pp. 158-165.

Chai, J.Y., et al., "Towards Conversational QA: Automatic Identification of Problematic Situations and User Intent," Proceedings of the COLING/ACL 2006 Main Conference Poster Sessions, Association for Computational Linguistics, 2006, pp. 57-64.

Coppola, N.W. et al., "Building Trust in Virtual Teams," IEEE Transactions on Professional Communication, vol. 47, No. 2, 2004, pp. 95-104.

De Visser, E.J., et al., "Almost Human: Anthropomorphism Increases Trust Resilience in Cognitive Agents," Journal of Experimental Psychology: Applied, 2016, 19 pages.

Farías, D.I.H., et al., "ValenTo: Sentiment Analysis of Fgurative Language Tweets with Irony and Sarcasm," Proceedings of the 9th International Workshop on Semantic Evaluation, 2015, pp. 694-698.

Felbo, B., et al., "Using millions of emoji occurrences to learn any-domain representations for detecting sentiment, emotion and sarcasm," Proceedings of the 2017 Conference on Empirical Methods in Natural Language Processing (EMNLP), 2017, 13 pages.

Freeman, C., et al., "Online Proactive Escalation in Multi-Modal Automated Assistants," Proceedings of the Thirtieth International Florida Artificial Intelligence Research Society Conference, 2017, pp. 215-220.

Freeman, C., "Paying Attention to Attention: Highlighting Influential Samples in Sequential Analysis," Arxiv.org, Cornell University Library, 2018, 10 pages.

Holton, J.A., "Building trust and collaboration in a virtual team," Team Performance Management: An International Journal, vol. 7, Nos. 3 and 4, 2001, pp. 36-47.

Kim, B., et al., "Two-stage multi-intent detection for spoken language understanding," Multimedia Tools and Applications, 2016, 14 pages.

Laflen, A., et al., "Okay, my rant is over: The language of emotion in computer-mediated communication," Computers and Composition, vol. 29, No. 4, 2012, pp. 296-308.

Lee, M.K., et al., "Receptionist or Information Kiosk: How Do People Talk With a Robot?," Proceedings of the 2010 ACM conference on Computer supported cooperative work, ACM, 2010, pp. 31-40.

Levenshtein, V.I., "Binary Codes Capable of Correcting Deletions, Insertions, and Reversals," Soviet Physics-Doklady, vol. 10, No. 8, 1966, pp. 707-710.

Levy, S., "Alexa, Tell Me Where You're Going Next," Backchannel.com, available online at https://backchannel.com/alexa-tell-me-where-youre-going-next-739c53ff10b3, 2016, 8 pages.

Martens, D., et al., "Explaining Data-Driven Document Classifications," MIS Quarterly, 2014, 54 pages.

Ribeiro, M., et al., "Why Should I Trust You? Explaining the Predictions of Any Classifier," Proceedings of the $22^{nd}$ ACM SIGKDD International Conference on Knowledge Discovery and Data Mining, 2016, pp. 1135-1144.

Sarikaya, R., et al., "An overview of end-to-end language understanding and dialog management for personal digital assistants," IEEE Workshop on Spoken Language Technology, 2016, pp. 391-397.

Shen, P., et al., "Automatic Speech Emotion Recognition Using Support Vector Machine," 2011 International Conference on Electronic and Mechanical Engineering and Information Technology (EMEIT 2011), vol. 1, 2011, pp. 1-538.

Ververidis, D., et al., "Emotional speech recognition: Resources, features, and methods," Speech Communication, vol. 48, 2016, pp. 1162-1181.

Viterbi, A.J., "Error Bounds for Convolutional Codes and an Asymptotically Optimum Decoding Algorithm," IEEE Transactions on Information Theory, vol. 13, No. 2, 1967, pp. 260-269.

Xu, P., et al., "Exploiting Shared Information for Multi-intent Natural Language Sentence Classification," INTERSPEECH, 2013, pp. 3785-3789.

Xu, H., et al., "Minimum Bayes Risk decoding and system combination based on a recursion for edit distance," Computer Speech & Language, vol. 25, Issue 4, 2011, pp. 802-828.

Yang, Z., et al., "Hierarchical Attention Networks for Document Classification," Proceedings of NAACL-HLT 2016, San Diego, Jun. 12-17, 2016, pp. 1480-1489.

\* cited by examiner

HUMAN-TO-HUMAN CONVERSATION ANALYSIS

RELATED APPLICATION

This application is a continuation application of U.S. patent application Ser. No. 16/504,773 filed Jul. 8, 2019, now patented, which is a divisional application of U.S. patent application Ser. No. 13/778,824, filed Feb. 27, 2013, now U.S. Pat. No. 10,346,542 issued Jul. 9, 2019, which claims the benefit of U.S. Provisional Application No. 61/696,040 filed on Aug. 31, 2012, all of which are incorporated by reference herein in their entirety.

BACKGROUND

In the modern world, goods or services may be offered through or supported by a telecommunications-based network of customer assistance centers that can receive and handle communications from various customers. Such centers have long used telecommunications systems that allow customer service representatives to speak with customers over the phone. These call centers often employ tens or hundreds of human agents to serve and be responsive to the needs or desires of the customers. More recently, customer service centers allow agents to interact with customers through live-chat have become increasing common. Many of these "chat" centers are accessible by the consumers from within a webpage or other form of electronic content.

Whether using voice or text chat, the customer service representatives typically engage the consumers in a dialog to identify the needs of the consumers and provide answers or solutions. Many of these conversations are recorded and saved for purposes such as maintaining standards of quality service and for training new customer service representatives. The organizations that store records of these customer-service interactions may accumulate thousands of conversation records. However, these records that could be valuable resources are generally not used other than for quality and training purposes. Accordingly, additional uses for these conversation records may have significant utility.

SUMMARY

This document describes, in part, techniques for analyzing individual conversation records to characterize the conversations according to multiple metrics. When a large corpus of conversations records are each analyzed (e.g., all the conversations from a given call center in the month of August) high-level features of the dataset as a whole are revealed. Additionally, when the characteristics of conversations that a particular entity (e.g., company, store, call center, etc.) are made apparent, it becomes possible to estimate the extent and the ease with which some of the humans working at that entity could be replaced with a "virtual agent."

The virtual agent is a computer-implemented interface between end users and information or services that would otherwise be provided by a customer service agent. The virtual agent may be implemented with software and/or hardware resources that provide artificial intelligence (AI), natural language processing (NLP), voice recognition, and the like.

The techniques disclosed herein describe automated analysis of a corpus of human-to-conversations that includes multiple conversations between at least two humans such as a customer and a customer service agent. The corpus of human-to-human conversations is accessed and individual conversations in the corpus are scored according to one or more metrics. All or fewer than all of the conversations in a given corpus may be scored. The metric or metrics may be indicative of the difficulty in creating a virtual agent to generate dialogue that could replace one of the humans in the original conversation. The metrics for many of the individual conversations can be combined to generate a representative metric for all or part of the corpus of human-to-human conversations.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to apparatus(es), system(s), method(s), computer-readable instructions, module(s), algorithms, and/or the like as permitted by the context above and throughout the document.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Example Architecture

Figure 1:
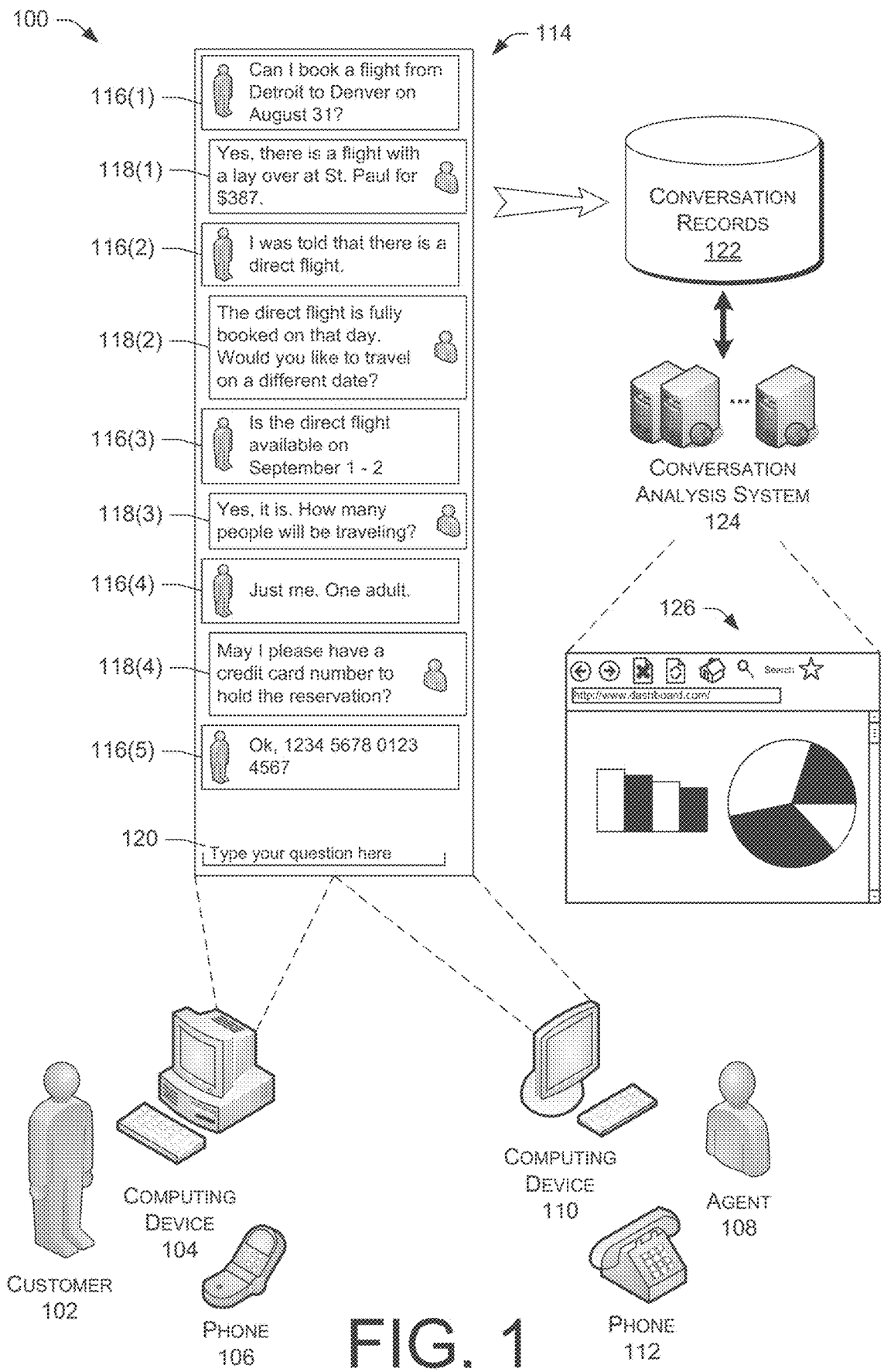
FIG. 1 illustrates an example architecture that enables a customer and an agent to generate a conversation which can be stored with other conversations records and analyzed by a conversation analysis system.

FIG. 1 illustrates an example architecture 100 that includes a user 102 operating a computing device 104 or a phone 106 to interact with a customer support representative or "agent" 108 who is interacting with his own computing device 110 and/or phone 112 in order to converse with the customer 102. Although the examples and discussion provided herein are directed to communications between a customer 102 and an agent 108, it is to be understood that the principles applied to analyzing the conversations are equally suitable to a conversation between any two, or more, parties.

The agent 108 may work at a customer service center which may receive a plurality of incoming calls or text communications from a plurality of customers. Furthermore, the customer service center may be comprised of a network of centers located in different geographic locations. The phone calls to the customer service center may be placed over a conventional public telephone network (e.g., POTS) or over a Voice Over Internet Protocol ("VOIP") network. Text communications to the customer service center may similarly be placed over the Internet or another network such as a mobile communication provider's short message service (SMS) network. The customer service center may have a plurality of agents 108 interacting with the plurality of customers 102. Thus, while only a single agent 108 and a single customer 102 are illustrated in FIG. 1, it should be understood that a plurality of different customer service representatives may be associated with the customer service center. As readily understood, the interactions may also be between more than two people such as two different customers communicating with a single agent or two different agents working together to address the needs of a single customer.

A dialog 114 between the customer 102 an agent 108 develops as the customer 102 and the agent 108 exchange communication utterances with each other. In this architecture 100 the dialog 114 is represented as a series of speech bubbles containing utterances from the customer 102 and utterances from the agent 108. Each of the speech bubbles may represent text input provided by the customer 102 or the agent 108. Alternatively, the speech bubbles shown in architecture 100 may represent verbal communication such as speech communicated using the phones 106 and 112. The following analyses of the verbal communication may be performed in a manner similar to that of text input by converting the speech of the customer 102 and agent 108 into text using voice recognition and speech-to-text processing.

In the case a real-time chat, the dialog 114 may be presented to the customer 102 and/or the agent 108 as a conversation graphical user interface (GUI) that shows alternating speech bubbles. The customer speech bubbles 116 may be visually distinguished from the agent speech bubbles 118 by inclusion of an icon or graphic that represents the customer/agent as well as by offsetting the speech bubbles within a display area. In this example, the customer speech bubbles 116 are offset to the left while the agent speech bubbles 118 are offset to the right. The conversation GUI may also include an interface area 120 that captures input from the customer 102, including via typed input, audio or speech input, touch input and gesture input. Gesture or emotive input may be captured if the computing device 104 is equipped with a camera or other sensor. All conversations, whether generated by a text chat, by voice, or by other form of communication may be converted to a text format and stored for later retrieval and viewing with a layout similar to the conversation GUI shown here in FIG. 1. Thus, the dialogue 114 may represent any type of conversation that is originally text or later converted to text and shown using a conversation GUI that is similar or different to the example GUI shown in FIG. 1.

In response to receiving a query from the customer 102, in speech bubble 116(1) the agent 108 response with the utterance shown in speech bubble 118(1). The dialogue 114 is shown continuing here through speech bubble 116(5) when the customer 102 provides a credit card number. The conversation between the customer 102 and agent 108 may continue for longer than is shown in this example dialogue 114.

This dialogue 114 may be stored in the conversation records 122 that include dialogue from multiple conversations. The conversation records 122 may store many thousands or tens of thousands of conversation records. For example, the conversation records 122 may store records of all of the conversation conducted by agents at the same customer service center as agent 108. However, individual conversation files within the conversation records 122 may be separated and grouped into sub-records or multiple conversation records 122 (e.g., from multiple customer service centers of the same company) may be aggregated into larger corpus of data. The individual records in the conversation records 122 may be recorded as text files, word processing files, audio files, proprietary conversation-record formats, or any other suitable file format. At present there is no broadly accepted standard for recording real-time chat conversation records, and many entities such as customer service centers use proprietary file formats that are incompatible with the conversation records from other entities.

The architecture 100 also includes a conversation analysis system 124 which may be implemented as one or more computing devices to analyze the conversations, both individually and in aggregate, stored in the conversation records 122. The conversation analysis system 124 may be owned and maintained by the same business or entity that operates the customer service center that includes the agent 108. In other implementations, a third-party that is not directly associated with either the customer 102 or the agent 108 may operate the conversation analysis system 124. For example, an airline that has a data store of conversation records 122 may contract with a third-party service provider who owns and operates the conversation analysis system 124 in order to obtain an analysis of conversation records that belong to the airline.

The conversation analysis system 124 may process the dialogue 114 by dividing the dialogue into a series of dialogue turns. Each dialogue turn may correspond to an utterance of one of the participants in the conversation and may also correspond to the visual representation of the speech bubbles 116 and 118. The files stored in the conversation records 122 may be formatted with tags or other markers that indicate transition between the participants in the conversation. This information may be used by the conversation analysis system 124 to readily distinguish dialogue turns in the dialogue 114.

Other techniques may be used if utterances in the dialogue 114 are not clearly assigned to a particular party. For example, textual analysis such as identifying carriage returns, tabs, changes in font, changes in text color, etc. may be used to infer when the speaker changed from the customer 102 to the agent 108 or vice versa. For spoken conversations that may be stored as audio recordings, decomposing the conversation into dialogue turns may be performed before or after speech recognition. For example, the audio characteristics of the speakers of voices may be distinguished without fully interpreting the words and each change in voice may be mapped to a change from one dialogue turn to the next dialogue turn. The audio characteristics may include characteristics of the humans' voices as well as audible features that are introduced by the communication technology. For example, if the customer 102 is speaking on a phone 106 that is a mobile phone, there may be features inherent in that audio that readily distinguish words spoken by the customer 102 from words spoken by the agent 108 due to noise, distortion, or other artifacts created by the microphone and transmission of the customer's voice from a mobile phone.

In addition to dividing the dialogue 114 into a series of dialogue turns, each dialogue turn may be assigned to one of the participants in the dialogue 114. Here, the dialogue turns 116 represent utterances from the customer 102 and the dialogue turns 118 represent utterances from agent 108. Dividing the dialogue 114 into dialogue turns and assigning a speaker to each dialogue turn may be performed as a single processing step or as sequential steps.

Additionally, the conversation analysis system 124 may normalize conversation records by converting different format the conversation records into a common format. For example, one possible format or schema for representing conversations may include a series of dialogue turns that are arranged in a sequential order, contain content which is the utterance of one of the humans participating in the conversation, and a timestamp. Normalizing conversation records 122 to a common schema may also allow the conversation analysis system 124 to make comparisons and derive metrics across datasets that exist in otherwise incompatible formats.

Pseudocode for creating a converting a dialogue 114 into a conversation having discrete dialogue turns is shown below.
class Conversation:

```
    def _ init _ (self,turnList=None,cid=None):
        Create a conversation object from a list of turns. Each turn is
    expected to be a sequence containing three elements where the
    first two are strings and the last is a timestamp.
        self.attrs = { } # this will store all attributes for the conversation
        if cid is not None:
            self.set("id",cid) # unique id of this conversation
        if turnList is not None:
            tmpTurns = [ ]
            for turn in turnList:
                tDict = { }
                tDict ["user"] = turn[ "user"] · strip( )
                tDict ["agent"] = turn["agent"].strip( )
                tDict ["timestamp"] = turn["timestamp"]
                tmpTurns.append(tDict)
            self.set("turns",tmpTurns) # the actual turns in the conv
```

Output from the conversation analysis system may be presented on a dashboard GUI 126 rendered from a site of the entity performing the analysis. The site may comprise a website, an intranet site, a downloaded application, or any other platform on which a user may access information from the conversation analysis system 124. The content of the dashboard GUI 126 may include any sort of details or information associated with the analysis of the conversations provided by the conversation analysis system 124. In some instances, the dashboard GUI 126 may be used by other people within the same entity that employs the agent 108 in order to better understand the conversations occurring in the customer service center. The dashboard GUI 126 may provide information that allows identification of the most courteous agents 108 and how their performance affects conversation outcome. Additionally, the agent's 108 effectiveness in making a sale or closing a transaction may be recorded in association with the conversations and the dashboard GUI 126 may then present one or more performance metrics specifically for the agent 108.

Additionally or alternatively, a party designing a virtual agent to partially fill the role of the agent 108 may use information presented on the dashboard GUI 126 in order to understand how difficult it would be to create a virtual agent to participate in conversations like those in the conversation records 122. The virtual agents may substitute for a human representative of the service provider and may be associated with a persona or virtual personality. The end user (e.g., customer) may communicate with the virtual agent through a text interface (e.g., a text box) that allows the end user to input queries, such as "where are you located?" or "when are you open?" In other implementations the virtual agent may recognize human speech and respond either with synthesized speech or text.

Virtual agents thus act as an effective interface that allows end users to seek information they desire while allowing service providers to realize cost savings associated with providing information from a machine rather than via a human representative. While these virtual agents are helpful to both end users and service providers, the ability of these virtual agents to emulate human representatives is still limited and there are many types of conversations and situations in which a virtual agent cannot replace a human agent. However, identifying the effectiveness and cost of designing a virtual agent for a specific setting requires an understanding of the types of conversations that may be encountered by the virtual agent. The conversation records 122 of past conversations may be representative of the types of conversations that a given call center will likely receive in the future, and thus, provide a basis for estimating the effectiveness of a virtual agent.

The dashboard GUI 126 may present information via the site that is accessible from any computing device connected to the same network as the conversation analysis system 124 (e.g., the Internet). The information may be shown in a graphical format using charts and illustrations. However, in other implementations the dashboard GUI 126 may be created by local software that does not render the dashboard GUI 126 over a network. Information contained in the dashboard GUI 126 may also be displayed in other formats such as text, a table, or another type of interface which is not graphical.

Example Dashboard GUI

Figure 2:
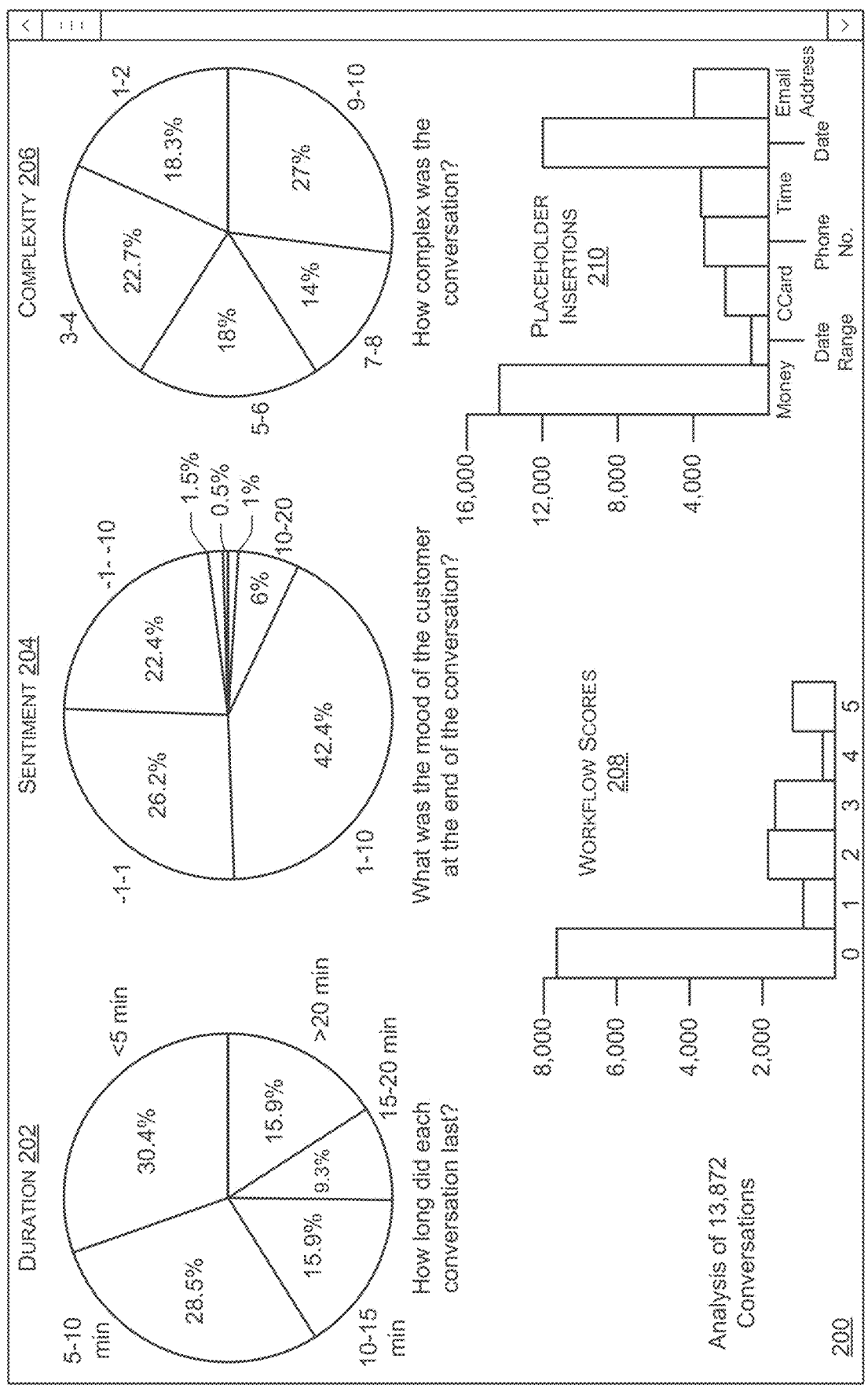
FIG. 2 shows an example dashboard graphical user interface (GUI) that presents multiple metrics about an illustrative set of conversation records.

FIG. 2 shows one view 200 of the dashboard GUI 126. In this example, the dashboard GUI 126 presents metrics derived from the analysis of 13,872 conversations. The 13,872 conversations may be stored in the conversation records 122. Each of those conversations may be summarized as a dialogue such as the dialogue 114 shown in FIG. 1. Although any number of metrics may be considered, this example includes pie charts identifying duration 202, sentiment 204, and complexity 206 metrics for the corpus of 13,872 conversations. The pie charts illustrate characteristics of groups of conversations within the total set of conversations. This example dashboard GUI 126 also includes bar charts illustrating workflow scores 208 and placeholder insertions 210 within the corpus of conversations. The specific techniques for visualizing the data may be changed without altering the principals of this disclosure. For example, data that is rendered as a pie chart may alternatively be rendered as a bar graph and vice versa.

Duration 202 is a measure of the length of a conversation. Duration 202 may be measured in any unit of time such as seconds or minutes. Generally, the duration 202 for a conversation is a length of time from the start until the end of the conversation. The duration 202 may be measured or calculated based on comparing timestamps associated with the first dialogue turn in the conversation and the last dialogue turn in the conversation. The difference between these two timestamps may be used as the measure of duration 202 for a conversation. In other implementations, file size may be used as a relative measure of duration such as the length of a file in characters, words, kilobytes, etc.

In this example view 200, 30.4% of the conversations are less than 5 minutes in duration, 28.5% of the conversations are between 5 and 10 minutes in duration, 15.9% of the conversations are between 10 and 15 minutes in duration, 9.3% of the conversations are between 15 and 20 minutes in duration, and 15.9% of the conversations are greater than 20 minutes in duration. Presentation of this information in a dashboard GUI 126 may be useful to show that, in this example, less than half of the conversations in this example corpus of conversations take more than 10 minutes. Similarly, if virtual agents tend to be more effective at dealing with shorter conversations, the pie chart of duration 202 may suggest that about a third to a half of the 13,872 conversations could be suitable for a virtual agent to function in place of a human agent 108.

Pseudocode that includes techniques for calculating the duration of a conversation is shown below.

```

# The start time, end time, and duration of the conv

start = turnList[O]["timestamp"]
self.set("starttime",start)
end = turnList[-1] ["timestamp"]
self.set ( " endtime " , end)
dur = end - start # create a timedelta object
self.set("duration",dur.total_seconds(»
```

Sentiment 204 represents the degree to which one of the humans participating in the conversation is happy or sad. Generally, sentiment analysis aims to determine the attitude of a speaker or a writer with respect to some topic or with respect to the overall conversation. The attitude may be his or her judgment or evaluation (e.g., as addressed by appraisal theory) or affective state (i.e., the emotional state of the speaker or writer). Sentiment 204 may be measured for either party in the conversation. In many customer service applications, the sentiment 204 of the customer 102 may be the main area of concern. However, the techniques for measuring sentiment 204 are equally applicable to the agent 108 or any other participant in a conversation. When applied to the customer 102, sentiment analysis measures how the customer 102 felt towards the end of the conversation with the agent 108. One goal of good customer service may be to create interactions that leave the customer 102 with a positive or happy feeling.

Sentiment 204 may be measured at different times within a single conversation or measured across the span of an entire conversation. Here, the view 200 shows sentiment 204 scores for the customers at the end of the conversations. The sentiment 204 of the customers may be calculated by any known technique for performing sentiment analysis such as analysis of key words, natural language processing, statistical analysis, and the like. Numerical metrics for measuring sentiment 204 may also be arbitrarily set. Sentiment metrics for the end of a conversation may be derived from the final dialogue turn of the customer 102, the last n dialogue turns of the customer 102 (where n is an integer greater than one). The number to dialogue turns to use for measuring sentiment 204, in other words the "n" value, may be determined experimentally, by trial and error, by judgment of a human designer, etc. Here, sentiment ranges from extremely negative opinion or feeling indicated by a score of −20 to an extremely positive or happy sentiment indicated by a score of +20.

In this example dataset, 1% of the customers are very happy with a sentiment score of 20. The next 6% of the customers are quite happy with a sentiment score between 10 and 20. The largest share of the conversations, 42.4%, ended with the customers being happy and having a sentiment score between 1 and 10. Customers with neutral sentiment scores between −1 and +1 represent 26.2% of the conversations. The customers ended up unhappy with sentiment scores between −1 and −10 in 22.4% of the conversations. The next slice of the pie, 1.5% represents the significantly unhappy customers with sentiment scores between −10 and −20. At the bottom, 0.5% of the conversations in this corpus of 13,872 conversations ended with the respective customers being very unhappy with sentiment scores of −20.

Interpretation of this data as representing "good" or "bad" results may depend on expectations and past measures of sentiment 204. For entities that are able to track and analyze customer service interactions over time, comparing changes in this graph of sentiment 204 may provide insight into high-level changes in the level of satisfaction or happiness the agents 108 are able to achieve for the customers 102. In terms of designing a virtual agent, the approximately one quarter of the conversations in which the customers ended with a sentiment score below −1 may suggest that there are certain customers or issues with which a virtual agent could not easily handle or at least not handle to the satisfaction of an upset customer.

Pseudocode for calculating the sentiment of a conversation is shown below.

```
def calcSentiment(self):
    Extract an estimate of the user and agent sentiment
    during the conversation. Note that the sentiment
    at the end of the conversation may count more
    towards the overall sentiment than the sentiment
    at the beginning.
        turnList .. self.get ("turns")
        usentiment = [ ]
        asentiment = [ ]
        for t in turnList:
            u = t ["user"]
            a = t ["agent"]
            if len(u) > 0:
                usentiment.append(myTFE.getSentimentScore(u))
            if len(a) > 0:
                asentiment.append(myTFE.getSentimentScore(a))
        self.set ("user_turn_sentiment",usentiment)
        self.set ("agent_turn_sentiment",asentiment)
        overAll = 0.0
        if len(usentiment) > 0:
            weight = 1.0/len(usentiment)
            for i in range(len(usentiment)):
                overAll += (i*weight) * usentiment[i]
        self.set("user_sentiment",overAll)
        overAll = 0.0
        if len(asentiment) > 0:
            weight = 1.0/len(asentiment)
            for i in range(len(asentiment»:
                overAll += (i*weight) * asentiment[i]
        self.set("agent_sentiment",overAll)
```

Complexity 206 is a measure of the complexity of a conversation. Complexity 206 may be a relevant conversation metric for determining how easily a virtual agent could replace a human agent 108 in certain conversations. Generally, virtual agents are better suited for dealing with simple conversations than complex conversations. Complexity 206 of a conversation can be measured by multiple different techniques and a single complexity score for a conversation may be generated by combining, either with varying levels of weighting or without, the results of multiple different complexity 206 measures.

One measure of complexity 206 in a conversation is the length of the first question posed by the customer 102. Longer questions are interpreted as being more complex than shorter questions. For simplicity, the length of the first dialogue turn by the customer 102 may be taken as being the first question and the length of that utterance in words, characters, etc. may be used as a relative measure of complexity 206. Alternative the first dialogue turn of the customer 102 that contains a question may be identified by looking for the presence of a question mark "?" in the dialogue turn or using natural language processing to understand the meaning of the utterance. In the dialogue 114 shown in FIG. 1 the first dialogue turn 116(1) includes the question "Can I book a flight from Detroit to Denver on August 31?".

Once the first dialogue turn of the customer 102 that contains a question is identified, the number of questions within that dialogue turn may be identified. A multipart question from the customer 102 on the start is interpreted as indicating a more complex conversation. Thus, a single dialogue turn of the customer 102 can provide two useful complexity 206 metrics: length and number of questions.

The length of a conversation, not as measured in duration 202 mentioned above, but in number of dialogue turns of all participants may also be used to infer the level of complexity 206 of the conversation. The dialogue 114 shown in FIG. 1, for example, includes nine total dialogue turns. The more back-and-fourths in a conversation may indicate that there was greater complexity and so more iterations were needed to address the customer's issue. A higher number of dialogue turns correlates with higher complexity.

Additionally, the number of questions from the agent 108 to the customer can serve as an indicator of complexity. The more times the agent 108 needs to ask something of the customer 102, to clarify or obtain additional information, the more likely it is that the conversation is complex. This metric may be substantially different than the length of the conversation in dialogue turns because in some conversations many of the dialogue turns of the agent 108 may be answers provided to the customer that do not include questions.

A modification, or addition, to this metric may look at pairs of dialogue turns to see how the agent 102 responds to a question from the customer 102. Each pair of dialogue turns may be a dialogue turn from the customer 102 (either question or not) followed by either (1) a dialogue turn of the agent 108 that does not include a question (i.e., an answer) or (2) a further question from the agent 108. The number of question-question pairs in a dialogue 114 may be compared to the question-answer pairs to obtain a metric that measures not only the number of agent questions but the density or frequency of agent questions. This complexity 206 metric may be obtained by calculating a ratio of the number of question-question pairs to the number of answer-answer pairs.

To obtain number of dialogue turns of the agent 108 that include at least one question, some or all of the dialogue turns of the agent 108 may be analyzed to determine if the respective dialogue turns include a question. The recognition of questions may be achieved by looking for question marks (or analogous characters, words, phrases in other languages that indicate a question) or NLP analysis of the content of the utterance. In some real-time chat customer service contexts, the agent 102 may copy and paste pre-written responses to use as his or her utterance. These pre-written response may be well suited for using question mark detection as the way to recognize questions because the pre-written response are likely to be properly punctuated and use question marks whenever a question is present. However, certain agents 108 may have conversation styles that use questions more frequently than other agents 108. This variability between different agents 108 may be considered as part of the normalizing complexity scores 206 across different conversations.

Pseudocode for identifying dialogue turns that include questions is shown below.

```
def _isAssistanceQuestion(self,inString):
    Returns True for questions like "how may I help you?" or "is there anything else I can assist you with?", etc."
    tmpStr = inString.lower( )
    if re.search(" (may)? i (assist|help) (you)?",tmpstr) 1= None:
        return True
    if re.search("(help|assist)( you)? with",tmpstr) 1= None:
        return True
    if re.search("help you out with",tmpStr) 1 = None:
        return True
    if re.search("help you (today|this evening|this morning)",tmpStr) 1= None:
        return True
    return False
def _getQuestions (self, inStrinq,includeAssistanceQuests=False):
    Break the given input string into separate questions. If there are no questions in the input string, then a list of just one item will be returned. If includeAssistanceQuests is False, then questions such as "how may I help you?" will not be included.
    outQuests = [ ]
    # Tokenize the input string into sentences
    sents = sent_tokenizer.tokenize(inStrinq)
    for s in sents:
        # Does it end with a '?'
        if len(s.strip( )) > 0 and s[-1]== '?':
            isAssist = self._isAssistanceQuestion(s)
            if isAssist is False:
                outQuests.append(s)
            else:
                if includeAssistanceQuests:
                    ouQuests.append(s)
    return outQuests
def _getAgentQuests(self):
    turns = self.get ("turns")
    aqentQuestsPerTurn = [ ]
    for t in turns:
        a = t ["agent"]
        if len(a»O:
            quests = self._getQuestions(a)
            # save the number of questions found in this turn
            agentQuestsPerTurn.append(len(quests))
    self.set ("agentQuestsperTurn",agentQuestsPerTurn)
    naq = sum (aqentQuestsPerTurn)
    self.set ("numAgentQuests",naq)
```

Each of the four techniques for estimating the complexity 206 of a conversation can be applied to information readily extracted from a dialogue 114. An "understanding" of the content is not required, so these techniques may be applied without use of NLP or other types of computationally intensive techniques. Accordingly, analysis of 10,000 or more conversations can be performed relatively quickly with conventional computing resources.

Additional techniques that use NLP or linguistic content analysis may also provide measures of complexity 206. In general, poorer language skills may cause more difficulty for an agent, virtual or human, to understand the customer 102 leading to a more complex conversation as the agent 108 deals with both linguistic challenges and underlying customer need. Linguistic content analysis may include grammatical correctness and spelling accuracy. Conventional grammar-checking and spell-checking techniques may be used. Lower scores indicate higher complexity. Readability scores can also be considered (e.g., Flesch reading ease test, Flesch-Kincaid grade level test, and the like) with higher readability correlating with a lower complexity 206 score.

Semantic distance between the dialogue turns of the customer 102 may also be used to measure complexity. Semantic distance is a concept that assigns a metric to a set of documents or terms based on the likeness of their meaning and/or semantic content. The semantic distance between two utterances can be measured using any known technique. Greater semantic distance, possibly suggesting that the customer 102 is asking unrelated questions, can suggest a greater complexity 206 for the agent 108.

In this example dataset, one or more of the complexity 206 metrics discussed above are used to generate normalized complexity scores that range from 0, very simple, to 10, very complex. For the 13,872 conversations 18.3% are very simple with complexity scores of 1 or 2. The next 22.7% are relatively simple with complexity scores of 3-4. The medium complexity conversations with complexity scores of 5 or 6 make up 18% of the data set. Finally, 14% of the conversations are complex with scores of 7 or 8 and 27% are highly complex with scores of 9 or 10. This analysis may show that, assuming the 13,872 conversations are representative of future conversations, about 40% of the conversations handled by the customer service center (i.e., with complexity scores from 1 to 4) may be readily addressed using a virtual assistant. However, the most complex conversations account for 27% of the total conversations so it is likely that human agents 108 will continue to be necessary for at least a portion of the conversations. Interestingly, measures of complexity 206 are rare or nonexistent in analysis of virtual agent conversations or human-machine conversations. This may be due to the upward bound imposed on conversational complexity by the inherent limits of the virtual agent, artificial intelligence algorithm, or the like. Human-to-human conversations and not so limited, and thus, measurement of complexity becomes a relevant question.

Pseudocode for calculating complexity 206 in a conversation is shown below.

```
def calcComplexity(self):
    Compute an estimate of the complexity of the given conversation.
The complexity estimate ranges from 0 to 10, with 10 being the most
complex.
    maxComplexity = 10
    complexity = 0
    if self.get ("numAgentQuests") is None:
        self._getAgentQuests( ) # extract the agent questions
    complexity + = self.get("numAgentQuests")
    # Test the length of the first user question and to see if there are
    # multiple questions in the first user question.
    fq = self-get ("firstUserQ")
    #
    # Test the length of the first user question
    #
    fQlen = len (fq)
    if fQlen < 100:
        pass # no added complexity
    elif fQlen >= 100 and fQlen < 200:
        complexity +-= 1
    elif fQlen >= 200 and fQlen < 300:
        complexity += 2
    else:
        complexity += 3
    self. set ( "fQlen" , fQlen)
    #
    # First user question contains multiple questions?
    #
    nQs=len(self._getQuestions(fq))
    if nQs > 1:
        complexity += 7 #
    self.set("nQuestInFQ",nQs)
    #
    # Test the length of the conversation
    #
    nTurns = self.get (" length" )
    if nTurns <= 4:
        pass # no added complexity
    elif nTurns > 4 and nTurns <= 8:
        complexity += 1
    elif nTurns > 8 and nTurns <= 12:
        complexity += 2
    elif nTurns > 12 and nTurns <= 16:
        complexity += 3
    else: # > 16 turns, probably pretty complicated
        complexity += 4 # most
    # Set the final complexity estimate
    self.set ("complexity",min(complexity, maxComplexity))
```

Workflow scores 208 for the 13,872 conversations are presented in the bar graph at the bottom center of the view 200. A workflow score 208 represents the degree to which the conversation can be characterized as having workflow-like features. Workflow-like features suggest that the conversation represents a series of logically connected steps that move the customer 102 and agent 108 closer towards accomplishing a task. A higher workflow score which is correlated with more workflow-like features in the conversation indicates that the conversation likely represents an algorithmic process (i.e., if the customer 102 provides certain information then agent 108 should respond with a certain question depending on the information from the customer 102). Workflow scores 208 are useful for determining the ability of a virtual agent to replace an actual human agent 108 because the more that a conversation follows a particular workflow with different conversational paths depending on answers provided by the customer 102, the more difficult it is to design a virtual agent that can properly accommodate all the possible paths throughout the workflow.

Conversational features such as a conversation following an established sequence of steps that the agent 108 must perform in order to accomplish a single task or a conversation that includes a defined set of questions which occur in a particular order are workflow-like features. These features suggest that a given conversation includes a workflow. Specific techniques for determining a workflow score 208 are discussed later, but for the purposes of the dashboard GUI 126 the workflow scores are normalized to a range of 0-5. In this range 5 indicates the conversation with very high workflow characteristics and 0 indicates a conversation with few or no workflow characteristics. Therefore, it is generally easier for a virtual agent to deal with conversations having low workflow scores such as 0 or 1. Each of the 13,872 conversations may be assigned a workflow score. In this example dataset almost 8000 of the conversations have very low workflow scores of 0. About 1000 conversations have workflow scores of 1 and there are fewer than 2000 conversations each with workflow scores of 2 and 3. Only a few hundred conversations have a workflow score of 4 and somewhere between 1000 and 2000 conversations are given a workflow score of 5. Thus, based on considering only workflow scores 208 it appears that well over half of the conversations in this corpus of 13,872 conversations could be performed by a virtual agent.

The next bar graph showing placeholder insertions 210 measures the number of particular keywords or categories of information that occur in the conversations. The specific topics that are searched for and identified such as, for example, money, date range, credit card information, phone number, time, date, and e-mail address maybe previously defined by a human editor or designer of the system. Different entities may define different terms that are important for respective businesses or other purposes. For example, conversation records of a financial institution may choose to track instances of information related to interest rates while a travel agency may choose instead to focus on terms related to time zones.

In some implementations, the raw data from past conversations that may be potentially included in the conversation records 122 can include personally identifiable or financial information. High-level analysis of the conversation dataset does not require access to specific information rather the particular values and data can be replaced by some type of generic placeholder field that represents the type of information and protects the privacy and financial records of the customer 102 or any other participant in the conversation. The personally identifiable and financial information may be scrubbed or removed from the conversation records prior to analysis by the conversation analysis system 124.

Text analysis or NLP may be used to identify and remove these types of data. Other, simpler techniques such as recognition of dollar signs "$" as indicating a money value, at symbols "@" in the middle of a word indicating an e-mail address, 16 digit strings of numerals interpreted as credit card numbers, and the like may also be used to replace financial data or personally identifiable information with placeholder insertions 210.

For each identified category or type of information that may be replaced with a placeholder insertion 210, the number of times that particular placeholder was used may be counted across the conversations in a dataset. Here, there are 13,872 conversations and somewhat more than 14,000 replacements of information related to money were made. Thus, on average there is more than one reference to money in every conversation. Similarly, there was a large number, about 12,000, placeholder insertions 210 in which an actual date was replaced with a corresponding placeholder. Presenting the placeholder insertions 210 data in a visual format such as the bar graph shown in view 200 allows for easy identification of which concepts and terms appear frequently across the conversations in a given corpus of conversations.

The dashboard GUI 126 may be implemented as an interactive interface allows the user to display data (e.g., by mouse click or other mechanisms) and "drill down" to receive more detailed information about the corresponding subset of the original data set. For example, the user can select the wedge on the complexity 206 by chart that corresponds to 18% of the conversations which had medium complexity and a score of 5 or 6. This subset of the original 13,872 conversations may be interesting to a user who is considering the challenges of using a virtual agent to replace some of the actual agents 108 that participated in these conversations because, for example, medium complexity conversations may be near the maximum level of complexity that can be handled by a particular type of virtual agent.

Upon selecting this portion of the pie chart, the other metrics displayed on the graphical user interface 126 may be updated to show corresponding values only for this subset of conversations (i.e., with a complexity score 206 of 5 or 6). Therefore the complexity 206 pie chart may be regenerated to show only two wedges that indicate how many of this original 18% of the conversations received a complexity score 206 of 5 and how many received a complexity score 206 of 6.

Providing an interactive interface, whether through a web-based format or otherwise, allows users to explore aspects of the corpus of conversations that would not otherwise be readily accessible. As an additional example, a user may wish to review the characteristics of the conversations in which the customers 102 were very unhappy and had a sentiment 204 of −20. Here, this represents about 69 conversations or 0.5% of the original 13,872 conversations. After selecting the corresponding wedge of the sentiment 204 pie chart, all of the other metrics displayed on the dashboard graphical user interface 126 may update. This can allow, for example rapid identification of what types of placeholder insertions 210 are most frequent in this subset of unhappy or angry customers. For example a manager of the customer service center may be interested in knowing if the conversations with the most negative sentiment scores more frequently discussed money or discuss dates.

With the interactive access provided to the conversation data by displaying high level information about the conversations in the dashboard GUI 126, a user can make comparisons and ask questions about the aggregated conversation data. The metrics shown in the view 200 are merely illustrative and any other metric that may be obtained from the conversation records 122 may also be represented in the dashboard GUI 126 either graphically or in another format. For example, time of day when the conversation begins, a type of device used by the customer 102 to participate in the conversation, a gender of the customer service agent, or other types of metrics that may be used to understand the data derived from analyzing a set of conversations.

If the agent 108 is operating within a customer service center environment from which there are many pre-written responses that the agent 108 may be encouraged to use when conversing with the customer 102, each utterance of the agent 108 may be compared to see if it is one of the pre-written responses. Then, a ratio of the dialogue turns 118 of the agent 108 that include pre-written responses to those that lack pre-written responses can be calculated in order to show how well the agent 108 "stays on the script." Moreover, the dashboard GUI 126 may display statistical analysis of the data based on analyses or computations performed by the conversation analysis system 124. For example, correlation between any two metrics may be tested for statistical significance using any known technique such as a t-test or analysis of variance (ANOVA).

Example Visual Representations of Conversation Processing

Figure 3:
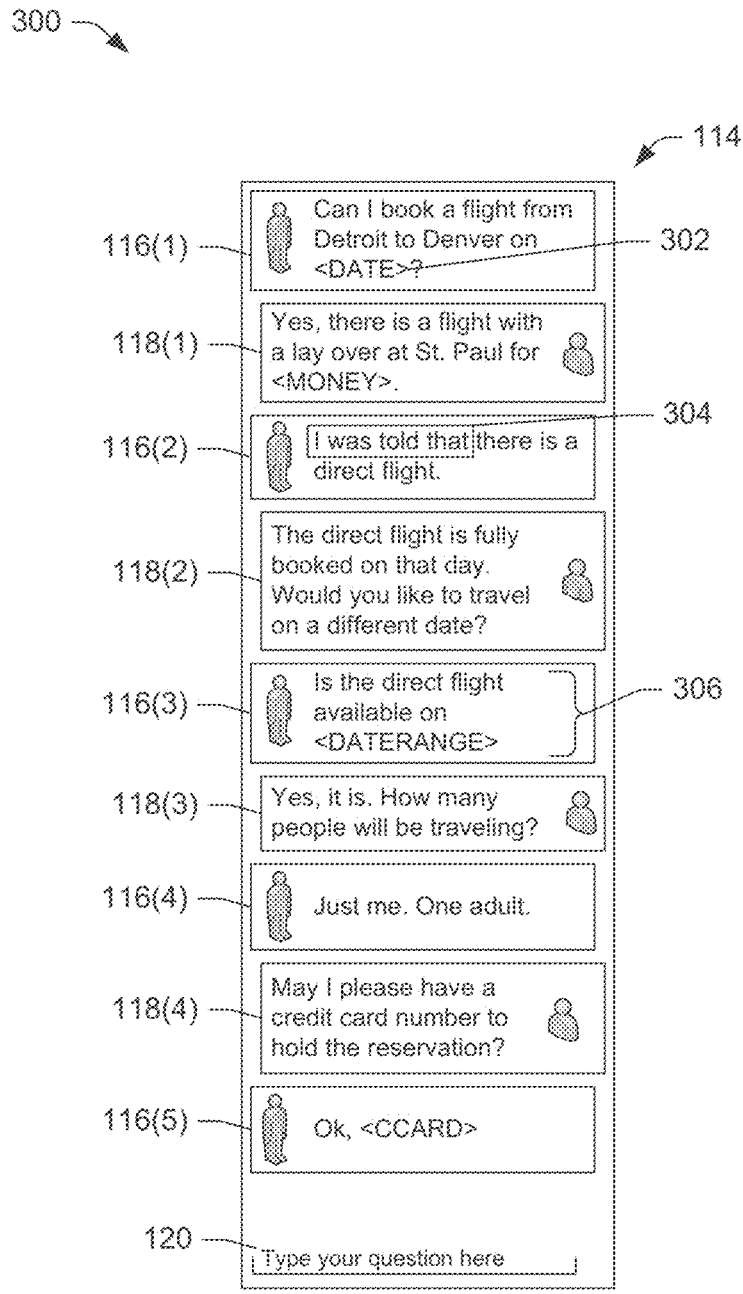
FIG. 3 shows a visual representation of dialog turns in the conversation of FIG. 1 after personally identifiable data and financial data are replaced with placeholders.

FIG. 3 shows a visual representation 300 of the dialogue 114 from FIG. 1. This representation 300 includes the same customer dialogue turns 116 and agent dialogue turns 118 shown in FIG. 1. However, this representation 300 of the dialogue 114 shows replacement of selected concepts with placeholders, identification of key phrases that indicate customer sentiment, and determination that a dialogue turn includes a question.

The first dialogue turn 116(1) of the customer 102 originally indicated specific date on which the customer 102 wished to travel to Denver. That date is now replaced by a <DATE> placeholder 302. Thus, the actual date on which the customer 102 wanted to travel is scrubbed from the dialogue 114. However, the type of information that was scrubbed is still shown by the corresponding placeholder 302. Additionally, having a standard tag or placeholder 302 that substitutes for the original date information which, when considering the corpus of conversations as a whole, may have been provided in multiple different formats (e.g., August 31, 08/31/2012, the 31st, next Friday, etc.) may make later analysis of the number of times this type of term appears in the dataset easier because the system is looking for a clearly defined tag rather than having to process and interpret the content of the conversation. Other placeholders such as <MONEY>, <DATERANGE>, <CCARD>, are also shown in later dialogue turns of this dialogue 114.

The second dialogue turn 116(2) of the customer 102 includes a phrase that is used to assess sentiment. Certain phrases and words may indicate when someone is happy, sad, frustrated, angry, etc. and a designer or programmer of the conversation analysis system 124 may manually define these specific phrases and words. In this example, the phrase 304 "I was told that" is associated with a negative sentiment score. This association is based on the recognition that people usually do not type or speak the words "I was told that" unless there is some type of negative feelings associated with the utterance. Detection and counting of these types of phrases 304 throughout the dialogue 114 are one way of assessing the sentiment of the customer 102 or any other type of conversation participant. Although using keywords or phrases to identify sentiment 204 may be a relatively rough metric, the application to a large dataset can provide an accurate high-level view of actual sentiments 204 held by participants in the conversations.

Identification of when a dialogue turn contains a question is important for some of the metrics discussed above. Some utterances, such as utterance 306 in the third dialogue turn 116(3) of the customer 102, include questions but do not have a question mark or other equivalent indicator. The lack of the question mark may be due to the customer 102 forgetting to type that character while participating in a real-time chat or speech-to-text conversion of a verbal conversation may result in text that has incorrect punctuation. Analysis of the content of the utterance 306 may be performed by using content analysis such as NLP to determine that the utterance 306 includes a question.

Although the above examples are directed to analysis of customer dialogue turns 116, the same techniques may be applied to the dialogue turns 118 of the agent 108. Additionally, the above techniques are equally applicable in conversation settings in which the roles are of the parties to the conversation different than customer and agent.

Figure 4:
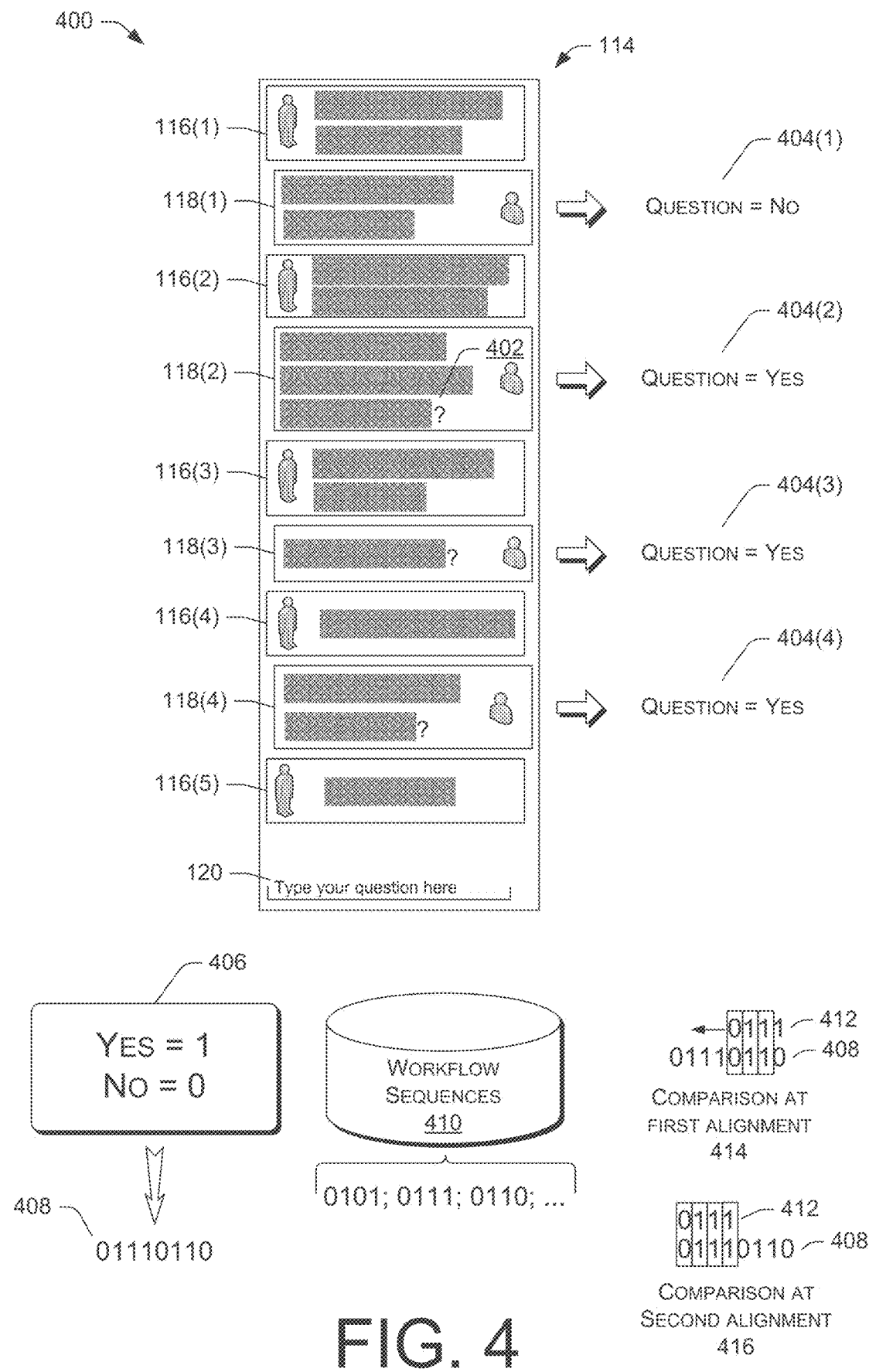
FIG. 4 shows an abstraction of the conversation of FIG. 1 into a series of "1s" and "0s" and comparison of this series to a predetermined series that is associated with a workflow sequence of a conversation.

FIG. 4 shows a visual representation 400 of the dialogue 114 from FIG. 1 being analyzed to determine a workflow score for the dialogue 114. The number and spacing of questions by the agent 108 to the customer 102 may be used as one technique for identifying the workflow characteristics of a dialogue. As discussed above, the dialogue 114 contains alternating dialogue turns between the customer 102 and agent 108. Some of the dialogue turns of the agent 108 may contain one or more questions. In this example dialogue 114, the second 118(2), third 118(3), and fourth 118(4) dialogue turns of the agent 108 contain questions. One way of identifying dialogue turns that include a question may be recognition of a question mark 402 as shown in the second dialogue turn 118(2) of the agent 108. Other techniques such as NLP may also be used to identify questions. However, in many customer service implementations the agent 108 may respond with pre-written text so the likelihood of the agent dialogue turns 118 being correctly punctuated is high. Accordingly, use of the presence or absence of question marks may be a relatively accurate technique for identifying agent dialogue turns 118 that include a question. For this particular technique the presence or absence of questions in the dialogue turns 116 of the customer 102 may be ignored.

Application of the techniques for identifying the presence or absence of a question allows for a question/no question characterization 404 to be made for each dialogue turn 118 of the agent 102. Here, the first dialogue turn 118(1) is characterized as question =no 404(1). The subsequent dialogue turns 118(2), 118(3), 118(4), are all characterized 404 as question=yes. For ease of representation and processing the characterizations 404 may be summarized with indicia 406 that indicates either question =yes or question=no. In this example representation 400 the indicia 406 are 1 for the dialogue turns 118 characterized as including a question and 0 the dialogue turns 118 that do not include a question. Any other type of indicia 406 besides these specific numerals may also be used without changing the principals of this technique.

Using indicia 406 to represent the features of the dialogue 114 allows for a compact series of indicia 408 to summarize the location of agent questions in the dialogue 114. In this example, the series of indicia 408 for this dialogue 114 is "0110110." This corresponds to eight dialogue turns 118 of the agent 108. Only four dialogue turns 118(1)-118(4) are shown in the visual representation of the dialogue 114. The indicia 406 for the additional four dialogue turns 118 are added for ease of illustrating additional features of this technique.

Subjective human analysis of conversations that have workflow-like characteristics can lead to identification of particular agent-question sequences that tend to be associated with conversations that include workflows. For example, the process of booking an airline ticket for a customer 102 is a workflow that may include the agent 108 asking a question in each dialogue turn 118 (e.g., What is your departure city?, What is your destination city?, What day would you like to leave?, and so forth). Thus, a data store 410 of workflow sequences can be populated based on human judgment of which series of questions indicates a workflow. The workflow sequences illustrated the workflow sequences data store 410 are "0101," "0111," and "0110." Thus, a sequence of agent dialogue turns 118 in the dialogue 114 that match one of the patterns identified in the workflow sequence data store 410 suggests that the dialogue 114 has some workflow characteristics.

All of the example workflow sequences discussed here are patterns of four indicia 406. However, the number of indicia 406 used to represent a workflow sequence may be more or less than four. Additionally, the workflow sequences used to compare against the series of indicia 408 from actual dialogue 114 may be shorter than the length of the series of indicia 408. Here, the workflow sequences are four digits long and the series of indicia 408 is eight digits long.

The comparative alignment of a single workflow sequence 412 such as the sequence "0111" to the series of indicia 408 may be made at multiple locations along the series of indicia 408. The comparison at a first alignment 414 shows that three of the four digits from the workflow sequence 412 match the aligned digit from the series of indicia 408. However, the fourth digit from the workflow sequence 412 does not match, and thus, this alignment between the workflow sequence 412 and a series of indicia 408 is not considered a match.

The workflow sequence 412 may be "slid across" or compared against different alignments with the series of indicia 408. After the workflow sequence 412 is slid three positions to the left relative to the series of indicia 408 it is possible to make a comparison at a second alignment 416. The comparison at the second alignment 416 shows that each of the digits of the workflow sequence 412 matches the corresponding digits of the series of indicia 408. This is considered a match. Thus, the dialogue 114 is considered to have some workflow characteristics because there was at least one alignment in which the workflow sequence 412 matched the series of indicia 408 derived from the dialogue 114.

The data store of workflow sequences 410 may include many more than the three workflow sequences illustrated here. The length of the series of indicia 408 may also be much longer eight digits for longer conversations. Therefore, a single workflow sequence may align with the series of indicia 408 at multiple places and multiple different workflow sequences may all have at least one position relative to the series of indicia 408 that generates a match. For example, the last four indicia 406 of the series of indicia 408 are "0110." One of the workflow sequences shown in the data store workflow sequences 410 has the same sequence. Therefore, this represents another match between a workflow sequence and the series of indicia 408.

Each instance of a match may be tallied and the total number of matches between the length of the series of indicia 408 and the multiple workflow sequences in the workflow sequence data store 410 may be summed. Each determination of a match can be an independent determination and multiple workflow sequences could match the series of indicia 408 in such a way that the workflow sequences overlap in whole or in part. The workflow score for the dialogue 114 can be based on the total number of matches or "hits" found by comparison to the workflow sequence data store 410. Workflow scores can also be identified for various portions of a dialogue 114. For example, the start of a dialogue 114 may have low workflow characteristics but change midway through to have high workflow characteristics at the end.

Here, the series of indicia 408 has two hits one of the sequence "0111" and another hit the sequence "0110." Thus, the workflow score for dialogue 114 may be simply the number of hits or 2. In other implementations, the raw number of hits may be normalized across a large number of conversations so that the respective workflow scores may be different values such as 1-5 as shown in FIG. 2.

Pseudocode for determining the workflow score of a conversation is shown below.

```
def caldworkFlow(self):
    Determine how "workflowish" this conversation is.
    if self.get("agentQuestsPerTurn") is None:
        self._getAgentQuests( ) # extract the agent questions
    aqs = self.get("agentQuestsPerTurn")
    # convert list of num quests to a string of 1's and 0's
    tmp_aqs = "".join([str(min(1,x)) for x in aqs])
    # Now look for question sequences that appear
    # to be a workflow-ish type of interaction
    wfpats = [('0110',2),('01110',3),('011110',4),('0111110',5),
        ('0101',1),('010101',2),('01010101',3)]
    wfscore .. 0
    for wfp,wfs in wfpats:
        if wfp in tmp_aqs:
            wfscore += wfs
    self.set('workflow',wfscore)
```

Example Processes

FIGS. 5-8 illustrate example processes 500, 600, 700, and 800 respectively. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processing units, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. These example processes may be performed on the conversation analysis system 124 of FIG. 1. However, it is to be appreciated that in other implementations the operations may be performed at other location(s) and/or device(s).

Figure 5:
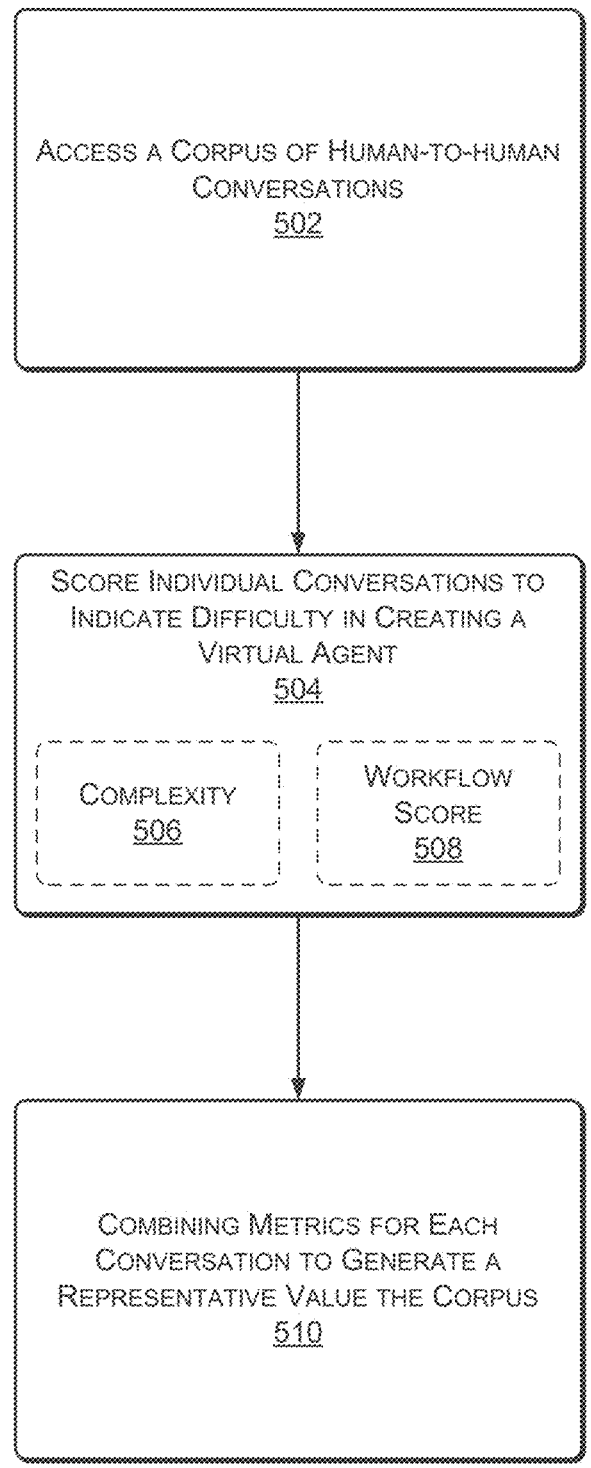
FIG. 5 illustrates an example process for scoring individual conversations in a corpus of conversations to generate metrics which are representative of part of the corpus of conversations.
Figure 5:
Figure 5:
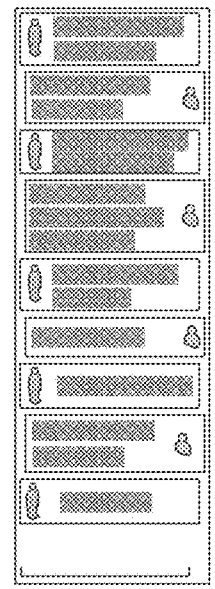
Figure 5:
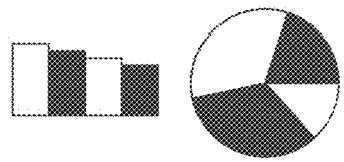

FIG. 5 shows a process 500 of identifying the difficulty with which a virtual agent could substitute for a human agent in individual conversations within a corpus of human-to-human conversations. At 502, a corpus of human-to human conversations is accessed. The corpus of conversations may be the conversation records 122 shown in FIG. 1. In some implementations, the corpus of human-to-human conversations may include over 1,000, over 10,000, or more separate conversations. Thus, techniques for automated analysis with moderate or low processing complexity may be advantageous for rapid analysis of datasets of this scale. The conversation records 122 may be accessed by the conversation analysis system 124.

If the original conversation was conducted as a live chat, one or more of the individual conversations that is stored in the corpus of human to human conversations may be stored as a record of the live text chat. Alternatively, if the conversation was conducted verbally such as over the phone, one or more of the individual conversations may be stored as a text record generated from speech-to-text analysis of the spoken communication. A given corpus of human to human conversations may include individual conversations that are derived from text chats, verbal communication, and any other communication techniques. In some implementations, accessing the corpus of human-to-human conversations may include converting one or more log files into a different file format. The file format that the log file the converted into may divide the human-to-human conversations into dialogue turns with the individual ones of the dialogue turns assigned to the human that generated the dialogue. Thus, Fred's dialogue is included in a dialogue turn that is tagged otherwise recognized in the file format as being associated with the identity of Fred. The conversion process may also adapt conversations that were originally in different formats (e.g., text, spoken word, etc.) into a common schema that includes textual representation of utterances broken into discrete dialogue turns.

At 504, individual conversations in the corpus of human-to-human conversations are scored according to one or more metrics that are indicative of difficulty in creating a virtual agent to generate dialogue that will replace one of the humans the respective individual conversations. In some implementations, each individual conversation in a corpus is analyzed to determine how difficult it would be to use a virtual agent to perform part of that conversation. However, in other implementations the analysis may be performed on less than all of the conversations within the corpus such as a representative or random sample of conversations. One or more of the individual conversations may be a conversation in which one of the human participants is a customer who asks one or more questions and the other human participant is an agent who answers the one or more questions. Each of the conversations within the corpus may have participants with the same roles such as customers and agents or the corpus may include conversations of multiple different types with participants having different roles. In some implementations, the human who is intended to be replaced by the virtual agent is the human customer service agent.

At 506, the metric used to score the individual conversations is a complexity score that represents a level of complexity in the one or more individual conversations. The complexity score may be calculated by any of the techniques discussed above.

At 508, the metric used to score the individual conversations is a workflow score that represents a likelihood that at least a portion of one or more of the individual conversations includes an algorithmic series of communications between the two humans to accomplish a task. The workflow score may be calculated by any of the techniques discussed above.

At 510, the one or more metrics for a plurality of the individual conversations are combined to generate a representative value of the one or more metrics for at least a portion of the corpus. For example, the representative value for a group of individual conversations may be the mean, median, mode, or other measure of the individual values of the metric for each of the individual conversations. Alternatively, the representative value may be a label that applies to a range of numerical values. For example, the top third of numerical range may be labeled "high," the middle third may be labeled "medium," and the bottom third may be labeled "low." The representative value of the one or more metrics may be displayed visually in a chart format such as any of the charts shown in the dashboard GUI 126.

The one or more metrics for may take on a range of values across the multiple individual conversations included in the corpus. This range of scores may be clustered into at least two groups by any type of clustering, bucketing, grouping, or similar technique. For example, if a given metric ranges from 0 to 10, the clustering may create two groups of conversations: a first group with scores from 0 to 5.0 and a second group with scores from 5.1 to 10. The group from 0 to 5.0 may be labeled the "low" group and the group from 5.1 to 10 may be labeled the "high" group. Each of the at least two groups includes a certain number of the individual conversations and the portion or percentage of total conversations that is included in the given group may be associated with the group. For example, the "low" group mentioned above may include 60% of the usual conversations out of the corpus of human to human conversations, so that group may be associated with the 60% or 6/10 proportion.

Figure 6:
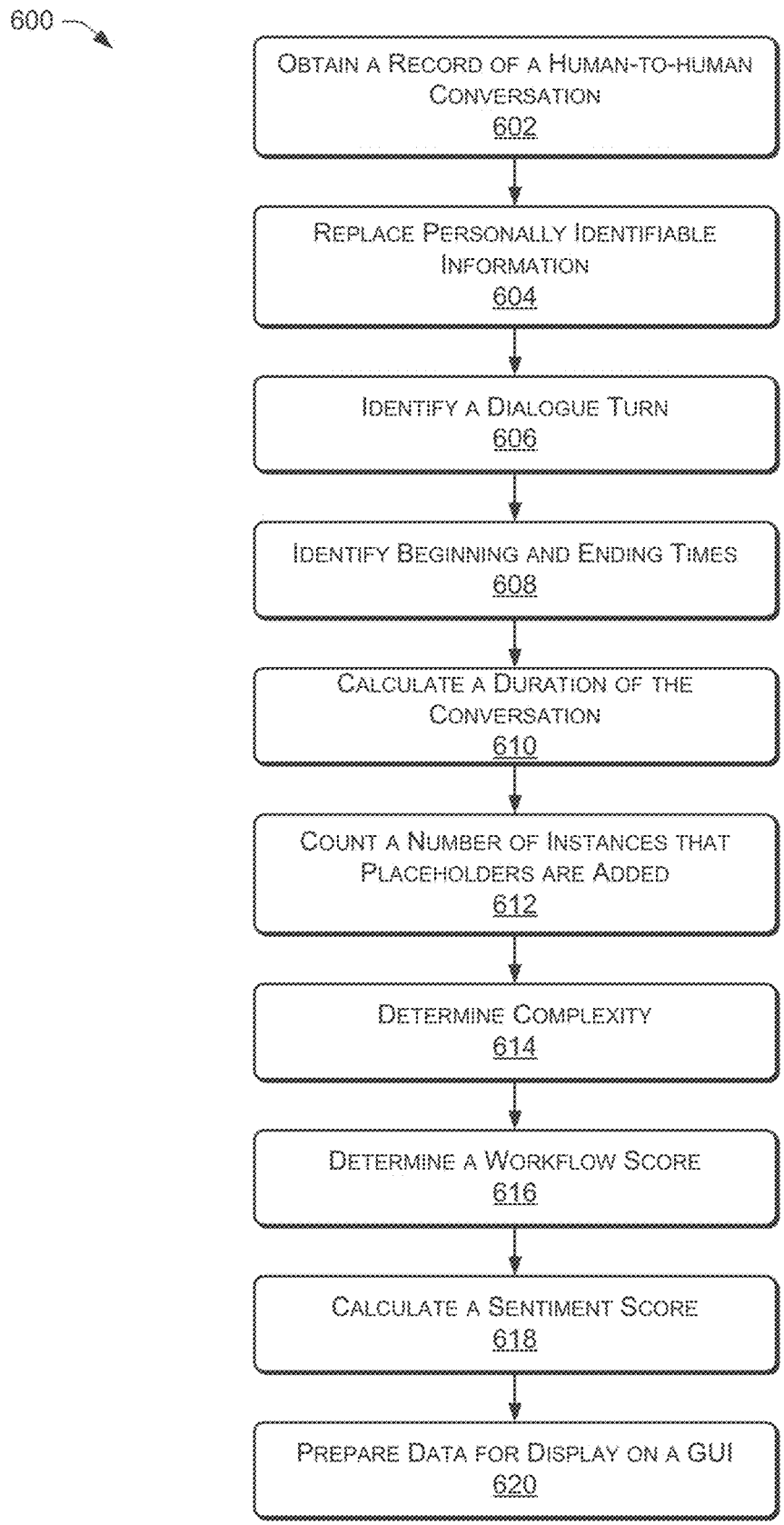
FIG. 6 illustrates an example process for calculating duration, a number of placeholders, complexity, workflow scores, and sentiment scores for multiple conversations and preparing the resulting data for presentation on a GUI.

FIG. 6 shows a process 600 for analyzing a record of a human-to-human conversation and preparing data derived from that analysis for display. At 602, a record of a human-to-human conversation between a customer and an agent is obtained.

At 604, personally identifiable information and financial information is replaced with placeholder data that corresponds to the type of information replaced.

At 606, dialogue turns that comprise customer dialogue turns containing communication from customers and agent dialogue turns containing communications from agents are identified. Thus, portions of the conversations are identified as dialogue turns and the dialogue turns, once identified as such, are further identified as either a customer dialog turn or an agent dialog turn.

At 608, a beginning time and an ending time of the conversations are identified.

At 610, a duration of the conversation based on the beginning time and the ending time is calculated. The calculations may include calculating a difference between the ending time and the beginning time of the conversation.

At 612, a number instances that one or more multiple different types of placeholder data was added to the records are counted.

At 614, a complexity score for the conversation is determined. The complexity score may be based at least in part on one or more of a number of separate questions contained in the first dialogue turn of the customer, a length of a communication in the first dialogue turn of the customer, a number of dialogue turns in the conversation, and/or a number of dialogue turns of the agent that contain at least one question.

At 616, a workflow score for the conversation is determined based at least in part on content in dialogue turns of the agents. The workflow score may indicate the probability that a series of dialogue turns in the conversation are communications in which the agent engages in multiple dialogue turns in order to accomplish a task for the customer. The workflow score may include a score based at least in part a sequence of dialogue turns of the agent, the sequence of dialogue turns characterized by the number and order of dialogue turns that contain at least one question and the number and order of dialogue turns that lack questions.

At 618, a sentiment score is calculated for the conversation. The sentiment score may represent an inference about the degree of positive or negative feelings the customer has for the conversation. A sentiment score may also be calculated for the agent or any other participant in the conversation. In some implementations, the sentiment score is calculated for at least two points in the conversation and a change in sentiment between the two points in the conversation is determined. For example, a sentiment score of the customer may be calculated at the beginning and at the end of the conversation to determine if the sentiment of the customer changed.

At 620, data representing the duration as calculated at 610, the number of instances that one or more of the multiple different types of place holder data was added to the records as calculated at 612, the complexity score as determined at 614, the workflow score as determined at 616 and/or the sentiment score as determined at 618 may be prepared for display on a graphical user interface (GUI). The preparing may include formatting or processing the data for display in a webpage so that the GUI is ready to be rendered in a browser window of a client device in response to a request for the webpage. Alternatively, the preparation may include causing a computing device to render all or part of the GUI on a local display device. The GUI may be the same or similar to the dashboard GUI 126 shown in FIG. 2.

Figure 7A:
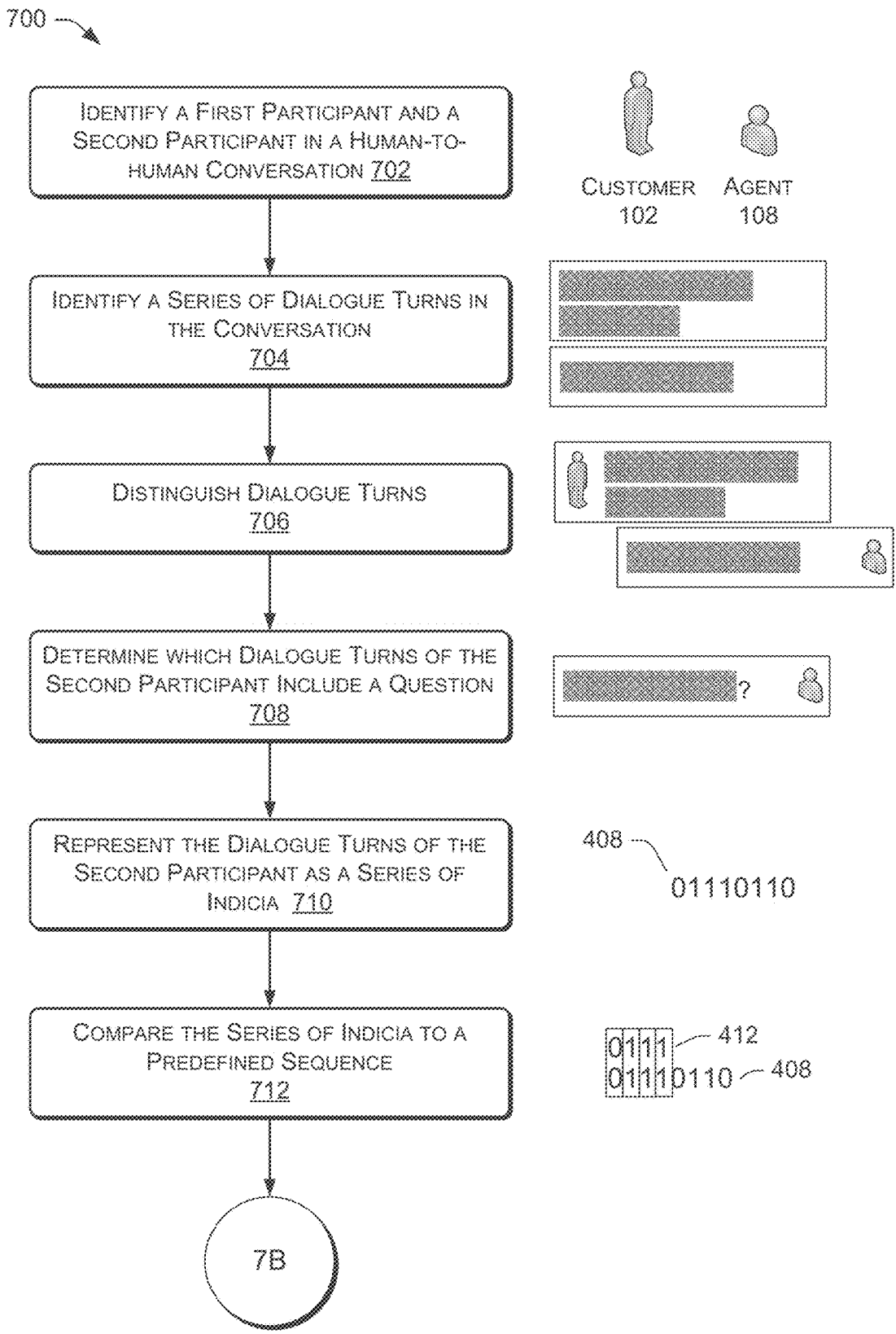
FIGS. 7A-B collectively illustrate an example process that analyses a conversation and calculates a workflow score to the conversation.
Figure 7B:
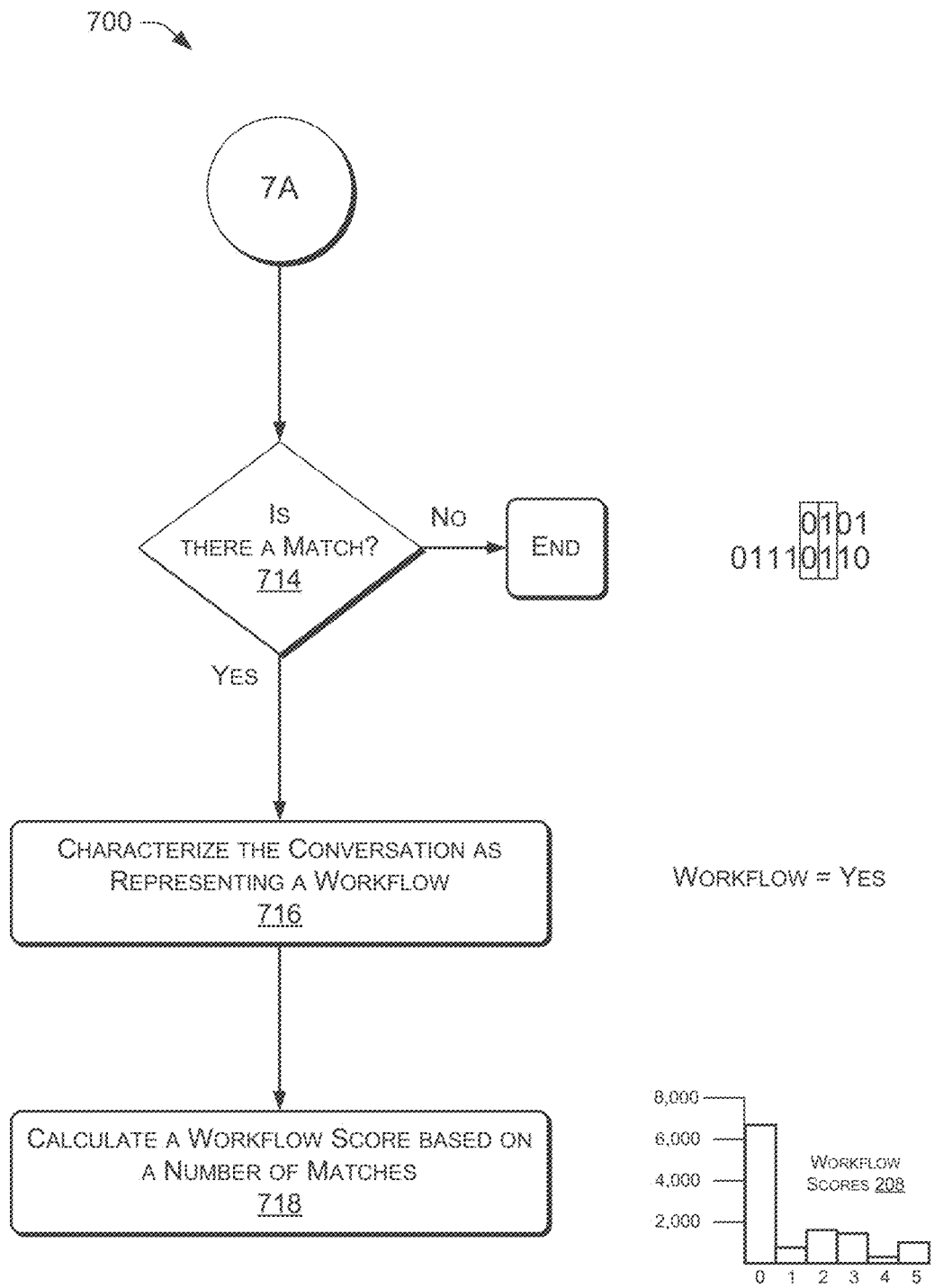

FIGS. 7A and 7B show a process 700 for identifying workflow characteristics of a human-to-human conversation. At 702, a first participant in the human-to-human conversation that is seeking information or assistance from a second participant in the human-to-human conversation is identified. The first participant that is seeking information or assistance may be the customer 102 discussed above. The second participant may, in some implementations, be the agent 108 discussed above.

At 704, a series of dialogue turns are identified in the human-to-human conversation. The dialogue turns represent portions of the conversation generated by either the first participant or the second participant. Just as a conversation alternates between two people, the dialogue turns alternate between the first participant and the second participant.

At 706, dialogue turns that contain communication from the first participant and dialogue turns that contain containing communications from the second participant are distinguished from one another.

At 708, dialogue turns of the second participant that include at least one question are identified. One technique for identifying dialogue turns that include at least one question includes identifying dialogue turns that include one or more question marks as dialogue turns including a question. Although the second participant may sometimes omit question marks, if at least one of the dialogue turns of the second participant comprises a pre-written response the pre-written response is likely to be properly punctuated and may more reliably include a question mark for those sentences that are questions.

At 710, the dialogue turns of the second participant may be represented as a series of indicia. Positions in the series include either a first indicia (e.g., "1") indicating that the corresponding dialogue turn includes at least one question or a second indicia (e.g., "0") indicating that a corresponding dialogue turn does not include a question.

At 712, an ordering of the first indicia and the second indicia in the series of indicia is compared to one or more predefined sequences of indicia. In some invitations, the predefined sequence of indicia may be shorter than the series of indicia. Additionally, the predefined sequence of indicia may be compared to multiple portions of the series of indicia such as, for example, by sliding the predefined sequence of indicia along the series of indicia to identify locations where there is a match.

At 714, it is determined if there is a match between a given predefined sequence of indicia and any possible alignment with the sequence of indicia. If there are no matches, process 700 proceeds along the "no" path and ends. If there are no matches a workflow score of zero may be assigned to the conversation. When there is at least one match between the one or more predefined sequences of indicia and at least a portion of the series of indicia, process 700 proceeds along the "yes" path to 716.

At 716, the human-to-human conversation is characterized as representing a workflow. A workflow is an algorithmic series of communications between the first participant and the second participant to accomplish a task. For example, the task may be assisting the customer 102 with transferring money from a checking account to a savings account. Agent 108 may follow a same or similar series of steps in any conversation related to this type of account transfer.

At 718, a workflow score based at least in part on a number of the one or more predefined sequences of indicia that match at least a portion of the series of indicia is calculated. The identification of workflow characteristics at 716 may be a qualitative or binary identification that simply labels a given conversation as either being a workflow or not being a workflow. However, the workflow score may be a continuously variable number that indicates the strength of a likelihood that a given conversation represents a workflow.

Figure 8:
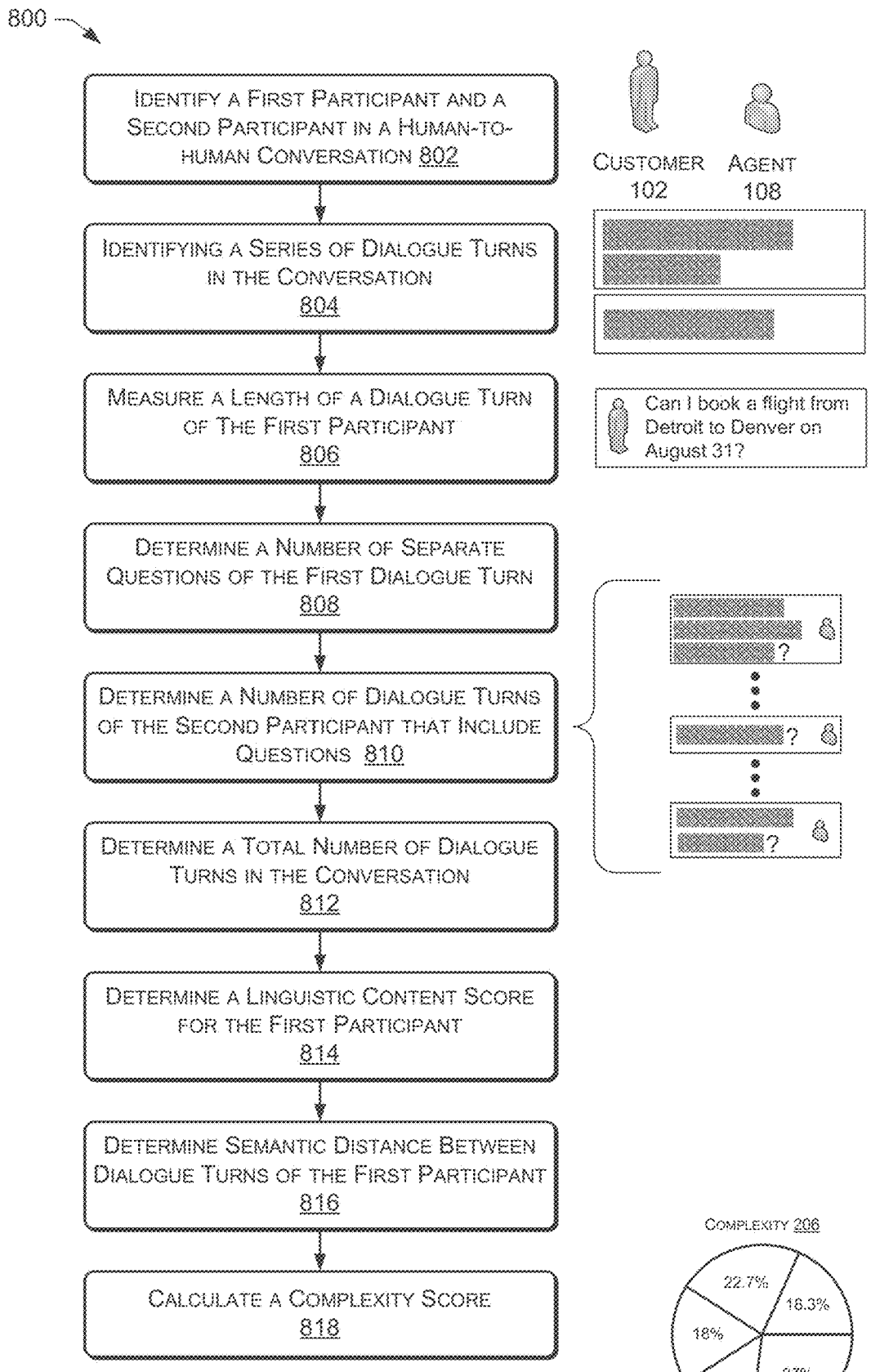
FIG. 8 illustrates an example process that calculates a complexity score for a conversation.

FIG. 8 shows a process 800 for calculating a complexity score of a human-to-human conversation. At 802, a first participant in the human-to-human conversation that is seeking information or assistance from a second participant in the human-to-human conversation is identified. For example, the first participant may be a customer 102 and the second participant may be an agent 108 as described above.

At 804, a series of dialogue turns in the human-to-human conversation that represent portions of the conversation generated by either the first participant or the second participant are identified. The dialogue turns may alternate between the first participant and the second participant.

At 806, a length of a first dialogue turn of the first participant is measured. The length of the first dialogue turn of the first participant may be measured by a number of words, a number of characters, a length of time, or some other metric.

At 808, a number of separate questions included in the first dialogue turn of the first participant are determined. The number of separate questions included in the first dialogue turn of the first participant may be determined by counting a number of question marks, by NLP, by other techniques, or by a combination of multiple techniques.

At 810, a number of dialogue turns of the second participant that include one or more questions are determined. The dialogue turns of the second participant that include one or more questions may be determined based on identification of dialogue turns that include at least one question mark.

At 812, a total number of dialogue turns in the conversation is determined. A complexity score may be calculated based at least in part on the total number of dialogue turns in the conversation. A conversation with a higher number dialogue turns is interpreted as a more complex conversation.

At 814, a linguistic content score of the of dialogue turns of the first participant is determined. The linguistic content score may be based on grammatical accuracy, spelling accuracy, or readability. The complexity score may be calculated based on the linguistic content score.

At 816, a semantic distance between dialogue turns of the first participant may be determined. The complexity score may be based on the semantic distance.

At 818, a complexity score may be calculated from the length of the first dialogue turn of the first participant as measured at 806, the number of separate questions included in the first dialogue turn of the first participant as measured at 808, the number of dialogue turns of the second participant that include one or more questions as measured 810, the total number of dialogue turns in the conversation as determined at 812, a linguistic content score for the first participant as determined at 814, and/or the semantic distance between dialogue turns of the first participant as determined at 816.

Example Conversation Analysis System

Figure 9:
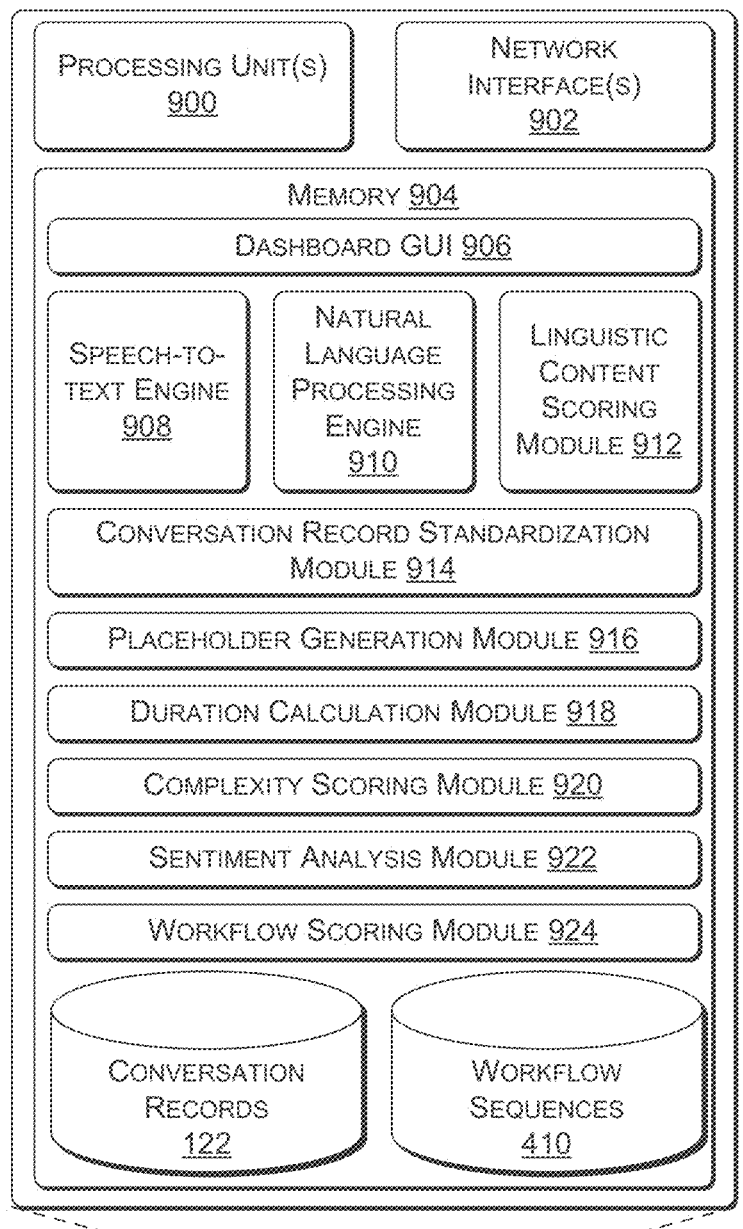
FIG. 9 illustrates example components that the conversation analysis system of FIG. 1 may utilize when analyzing a conversation.
Figure 9:
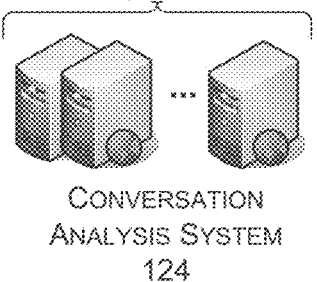

FIG. 9 illustrates example components that the conversation analysis system 124 may utilize when analyzing one or more conversations. As illustrated, the system 124 may be hosted on one or more servers that include one or more processing units 900, one or more network interfaces 902, and memory 904. The processing units 900 may be implemented as any type of processor with any number of cores.

Furthermore, while this description and FIG. 1 illustrate the conversation analysis system 124 as group of server computers, the conversation analysis system 124 may comprise any sort of computing device, such as a desktop computer, a mainframe computer, a laptop computer, a tablet computer, a local and non-networked server, a cloud-based presence not assigned to any defined hardware devices, etc. In each instance, the conversation analysis system 124 may include various additional components, such as one or more output devices (e.g., displays, speakers, etc.), one or more input devices (e.g., a keyboard, a touchscreen, etc.), an operating system, system busses, and the like.

The one or more network interfaces 902 may provide accesses to a network which may represent any type of communication network, including a local-area network, a wide-area network, the Internet, a wireless network, a wireless wide-area network (WWAN), a cable television network, a telephone network, a cellular communications network, combinations of the foregoing, and/or the like. Access to the network may connect the conversation analysis system 124 with the conversation records 122. Alternatively, all or part of the conversation records 122 may be stored in the memory 904.

The memory 904 stores modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, RAID storage systems, or any other medium which can be used to store the desired information and which can be accessed by a computing device.

The memory 904 may store or otherwise have access to a dashboard GUI 906 which may be the same as the dashboard GUI 126 shown in FIG. 2. The memory 904 may include a speech-to-text engine 908, a natural language processing engine 910, and a linguistic content scoring module 912. In various embodiments, the speech-to-text engine 908 may comprise an acoustic processor, an acoustic model, a language model, a lexicon, and a decoder. Speech recognition systems that have previously been developed to process and recognize human speech may also be used to output text based on the recognized speech.

The natural language processing (NLP) module 910 receives text and attempts to order speech parts within the text into logical words and phrases. The NLP module 910 may employ one or more language models to aid in this interpretation. The NLP module 910 may implement known or new natural language processing techniques to parse a received query for the purpose of identifying one or more concepts expressed therein.

The linguistic content scoring module 912 may receive text and score the text according to grammatical accuracy, spelling accuracy, or readability of the text. Known algorithms used by word processing, and other types of software may be applied to determine the characteristics which are used by linguistic content scoring module 912 to generate a score.

The memory 904 may also include additional modules for analyzing conversations such as a conversation record standardization module 914, a duration calculation module 918, a complexity scoring module 920, a sentiment analysis module 922, and a workflow scoring module 924. Although the conversation analysis system 124 is shown here with specific modules and features, it is to be understood that any of the modules described herein may be omitted and additional modules may be included within the conversation analysis system 124.

The conversation record standardization module 914 may convert conversation records from various formats into a standard format that utilizes a schema for representing conversations. The schema includes identifying dialogue turns in the conversation that are each associated with a speaker (or a "typist" for text chats). Each of the dialogue turns may also be associated with a timestamp. The content of the dialogue turns is text that may or may not include formatting.

The placeholder generation module 916 may identify certain keywords, terms, phrases, or concepts in a conversation and replace instances of those keywords etc. with placeholders. In some implementations, the placeholders may be used to scrub personally identifiable or financial information from conversation records. For example, an actual Social Security number may be replaced by the placeholder "<SSNUMBER>." However, the use of placeholders is not limited to only personally identifiable or financial information. The placeholder generation module 916 may operate by scanning through text representing the utterances of participants in a conversation and comparing the text with a list of keywords etc. that are to be replaced with placeholders. As a further example, the placeholder generation module 916 may identify any instance of 16 digits as a credit card number and replace those digits with a placeholder for credit card numbers.

The duration calculation module 918 may calculate the duration of a conversation. In some implementations, the duration calculation module 918 may use the timestamps associated with the dialogue turns in a conversation record to calculate the time difference between the first dialogue turn and the last dialogue turn. If the conversation is stored as an audio recording, a length of the audio recording may be used as the duration of the conversation.

The complexity scoring module 920 may apply any of the techniques discussed above for assigning a complexity score to a conversation. Each of the techniques such as length of the initial question, number of separate questions within the initial question, and the like may be given respective weights and a single complexity score may be based on a weighted combination of different measures of complexity. The relative weighting of different ways to measure complexity may be initially set by a human programmer or system designer.

The sentiment analysis module 922 may apply NLP, computational linguistics, text analytics, and other techniques to identify and extract subjective information from conversations. In some implementations, the sentiment analysis module 922 may measure the polarity of a given portion of text in a conversation and determine whether the expressed opinion is positive, negative, or neutral.

The workflow scoring module 924 may use any of the techniques described above to determine workflow characteristics for assigning a specific workflow score to all or part of a conversation. The workflow scoring module 924 may access a workflow sequence data store 410 stored in the memory 904 or elsewhere to obtain workflow sequences for comparison to a series of indicia generated from dialogue turns of the conversation.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method of automatically analyzing dialogue between humans to establish a metric indicative of suitability of virtual agent to interact with a customer in place of a human agent, value of the metric based on stored human-to-human conversation records, the method comprising:

accessing a corpus of human-to-human conversations;

scoring, using one or more processing units, individual conversations in the corpus according to one or more metrics, each of the one or more metrics being indicative of at least one dialogue characteristic selected from duration, sentiment, and complexity, to produce a respective metric score for each selected dialogue characteristic for individual conversations in the corpus; and producing a workflow score for the individual conversations in the corpus by scoring, using one or more processors, the individual conversations in the corpus according to a likelihood that at least a portion of the one or more individual conversations includes an algorithmic series of communications between two humans to accomplish a task, wherein the workflow score is based on a number and spacing of questions between the two humans for each individual conversation;

combining the respective metric scores for each selected dialogue characteristic-for individual conversations of the corpus to generate a representative value of the one or more metrics for the corpus; and outputting the representative value of the one or more metrics and the workflow score, the workflow score indicative of the suitability of the virtual agent to interact with the customer in place of the human agent for the individual conversation.

2. The method of claim 1, wherein, the corpus comprises over 1,000 individual conversations.

3. The method of claim 1, wherein, for an individual conversation, one of the humans is a customer and the other one of the humans is a customer service agent.

4. The method of claim 3, wherein representative value is indicative of difficulty in replacing the customer service agent with a virtual agent.

5. The method of claim 1, wherein one or more of the individual conversations is stored in the corpus as a live text chat between two humans.

6. The method of claim 1, wherein one or more of the individual conversations is stored in the corpus as a text record generated from speech-to-text analysis of spoken communication between two humans.

7. The method of claim 1, wherein the accessing comprises converting one or more log files into a different file format that divides the human-to-human conversations into dialogue turns, each of the dialogue turns assigned to one of the humans that generated the dialogue included in the respective dialogue turn.

8. The method of claim 1, wherein the one or more metrics comprise a complexity score that represents a level of complexity in one or more of the individual conversations.

9. The method of claim 1, wherein the respective metric score for each selected dialogue characteristic has a range of values across the individual conversations and the respective metric scores are separated into at least two groups, wherein a size of each group is proportional to a number of individual conversations, out of a total number of conversations in the corpus, that belong to the respective group.

10. The method of claim 1, wherein the workflow score is based at least in part on a sequence of dialogue turns of one of the two humans and is characterized by a number and order of dialogue turns in a sequence that contain at least one question.

11. The method of claim 10, wherein the sequence of dialogue turns is characterized by a number and order of dialogue turns in a sequence that lack questions.

12. The method of claim 1, further comprising presenting representation of the one or more metrics in a graphical user interface (GUI).

13. The method of claim 12, wherein the presenting representation of the one or more metrics in a graphical user interface (GUI) comprises presenting a dashboard showing multiple metrics for a plurality of the individual conversations.

14. The method of claim 12, wherein the representation includes at least one of a pie chart and a bar graph.

15. The method of claim 1, further comprising each dialogue turn in an individual conversation having a question is assigned a value of 1 and each dialogue turn in the individual conversation not having a question is assigned a value of 0 and the workflow score is produced based on the number of 1s and 0s in the individual conversation.

16. A system for automatically analyzing dialogue between humans to establish a metric indicative of suitability of virtual agent to interact with a customer in place of a human agent, value of the metric based on stored human-to-human conversation records, the system comprising:

one or more processors; and memory storing computer-executable instructions that, when executed by one or more processors, cause the one or more processors to:

access a corpus of human-to-human conversations;

score, using one or more processing units, individual conversations in the corpus according to one or more metrics, each of the one or more metrics being indicative of at least one dialogue characteristic selected from duration, sentiment, and complexity, to produce a respective metric score for each selected dialogue characteristic for individual conversations in the corpus; and produce a workflow score for the individual conversations in the corpus by scoring, using one or more processors, the individual conversations in the corpus according to a likelihood that at least a portion of the one or more individual conversations includes an algorithmic series of communications between the two humans to accomplish a task, wherein the workflow score is based on a number and spacing of questions between the two humans for each individual conversation;

combine the respective metric scores for each selected dialogue characteristic for individual conversations of the corpus to generate a representative value of the one or more metrics for the corpus; and output the representative value of the one or more metrics and the workflow score the workflow score indicative of the suitability of the virtual agent to interact with the customer in place of the human agent for the individual conversation.

17. The system of claim 16, wherein, the corpus comprises over 1,000 individual conversations.

18. The system of claim 16, wherein, for an individual conversation, one of the humans is a customer and the other one of the humans is a customer service agent.

19. The system of claim 18, wherein representative value is indicative of difficulty in replacing the customer service agent with a virtual agent.

20. The system of claim 16, wherein one or more of the individual conversations is stored in the corpus as a live text chat between two humans.

21. The system of claim 16, wherein one or more of the individual conversations is stored in the corpus as a text record generated from speech-to-text analysis of spoken communication between two humans.

22. The system of claim 16, wherein to access the corpus of human-to-human conversations, the computer-executable instructions, when executed by the one or more processors, cause the one or more processors to convert one or more log files into a different file format that divides the human-to-human conversations into dialogue turns, each of the dialogue turns assigned to one of the humans that generated the dialogue included in the respective dialogue turn.

23. The system of claim 16, wherein the one or more metrics comprise a complexity score that represents a level of complexity in one or more of the individual conversations.

24. The system of claim 16, wherein the respective metric score for each selected dialogue characteristic has a range of scores values across the individual conversations and the respective metric scores are separated into at least two groups, wherein a size of each group is proportional to a number of individual conversations, out of the total number of conversations in the corpus, that belong to the respective group.

25. The system of claim 16, wherein the workflow score is based at least in part on a sequence of dialogue turns of one of the two humans and is characterized by a number and order of dialogue turns in a sequence that contain at least one question.

26. The system of claim 25, wherein the sequence of dialogue turns is characterized by a number and order of dialogue turns in a sequence that lack questions.

27. The system of claim 16, further comprising presenting representation of the one or more metrics in a graphical user interface (GUI).

28. The method of claim 27, wherein the presenting representation of the one or more metrics in a graphical user interface (GUI) comprises presenting a dashboard showing multiple metrics for a plurality of the individual conversations.

29. The method of claim 27, wherein the representation includes at least one of a pie chart and a bar graph.

30. The system of claim 16, wherein each dialogue turn in an individual conversation having a question is assigned a value of 1 and each dialogue turn in the individual conversation not having a question is assigned a value of 0 and the workflow score is produced based on the number of 1s and 0s in the individual conversation.

* * * * *